United States Patent
Mehta et al.

(10) Patent No.: US 12,525,247 B2
(45) Date of Patent: *Jan. 13, 2026

(54) METHODS AND SYSTEMS FOR GENERATING AND RENDERING OBJECT BASED AUDIO WITH CONDITIONAL RENDERING METADATA

(71) Applicants: Dolby Laboratories Licensing Corporation, San Francisco, CA (US); DOLBY INTERNATIONAL AB, Dublin (IE)

(72) Inventors: Sripal S. Mehta, San Francisco, CA (US); Thomas Ziegler, Nuremberg (DE); Stewart Murrie, San Francisco, CA (US)

(73) Assignees: Dolby Laboratories Licensing Corporation, San Francisco, CA (US); DOLBY INTERNATIONAL AB, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/592,965

(22) Filed: Mar. 1, 2024

(65) Prior Publication Data
US 2024/0282322 A1      Aug. 22, 2024

Related U.S. Application Data

(60) Continuation of application No. 18/159,595, filed on Jan. 25, 2023, now Pat. No. 11,948,586, which is a continuation of application No. 16/996,367, filed on Aug. 18, 2020, now Pat. No. 11,568,881, which is a division of application No. 16/512,061, filed on Jul.
(Continued)

(51) Int. Cl.
*G10L 19/008*      (2013.01)
*G06F 3/16*      (2006.01)
(Continued)

(52) U.S. Cl.
CPC ............ *G10L 19/008* (2013.01); *G06F 3/165* (2013.01); *G10L 19/20* (2013.01); *H04S 3/008* (2013.01);
(Continued)

(58) Field of Classification Search
None
See application file for complete search history.

(56) References Cited

U.S. PATENT DOCUMENTS

| | | |
|---|---|---|
| 5,402,501 A | 3/1995 | Silfvast |
| 5,583,962 A | 12/1996 | Davis et al. |

(Continued)

FOREIGN PATENT DOCUMENTS

| | | |
|---|---|---|
| CN | 1711800 A | 12/2005 |
| CN | 1849579 A | 10/2006 |

(Continued)

OTHER PUBLICATIONS

"A Guide to Dolby Metadata" Jan. 1, 2005, pp. 1-28 (available at http://www.dolby.com/us/en/technologies/a-guide-to-dolby-metadata.pdf).
(Continued)

*Primary Examiner* — Qin Zhu

(57) ABSTRACT

Methods and audio processing units for generating an object based audio program including conditional rendering metadata corresponding to at least one object channel of the program, where the conditional rendering metadata is indicative of at least one rendering constraint, based on playback speaker array configuration, which applies to each corresponding object channel, and methods for rendering audio content determined by such a program, including by rendering content of at least one audio channel of the program in a manner compliant with each applicable rendering constraint in response to at least some of the condi-
(Continued)

tional rendering metadata. Rendering of a selected mix of content of the program may provide an immersive experience.

5 Claims, 6 Drawing Sheets

Related U.S. Application Data 15, 2019, now Pat. No. 10,748,547, which is a division of application No. 15/882,589, filed on Jan. 29, 2018, now Pat. No. 10,388,291, which is a division of application No. 14/781,544, filed as application No. PCT/US2014/032808 on Apr. 3, 2014, now Pat. No. 9,881,622.

(60) Provisional application No. 61/832,397, filed on Jun. 7, 2013, provisional application No. 61/807,922, filed on Apr. 3, 2013.

(51) Int. Cl.
| | | |
|---|---|---|
| *G10L 19/16* | (2013.01) | |
| *G10L 19/20* | (2013.01) | |
| *H04S 3/00* | (2006.01) | |
| *H04S 7/00* | (2006.01) | |

(52) U.S. Cl.
CPC .............. *H04S 7/30* (2013.01); *G10L 19/167* (2013.01); *H04S 2400/01* (2013.01); *H04S 2400/13* (2013.01); *H04S 2400/15* (2013.01); *H04S 2420/03* (2013.01)

(56) References Cited

U.S. PATENT DOCUMENTS

| | | | |
|---|---|---|---|
| 5,632,005 | A | 5/1997 | Davis et al. |
| 5,633,981 | A | 5/1997 | Davis |
| 5,727,119 | A | 3/1998 | Davidson et al. |
| 6,021,386 | A | 2/2000 | Davis et al. |
| 6,154,549 | A | 11/2000 | Arnold |
| 6,553,077 | B2 | 4/2003 | Rindsberg |
| 6,931,370 | B1 | 8/2005 | McDowell |
| 7,876,903 | B2 | 1/2011 | Sauk |
| 8,204,756 | B2 | 6/2012 | Kim et al. |
| 8,370,164 | B2 | 2/2013 | Beack |
| 8,571,875 | B2 | 10/2013 | Kim |
| 8,620,008 | B2 | 12/2013 | Oh |
| 2003/0053634 | A1 | 3/2003 | McGrath |
| 2004/0247134 | A1 | 12/2004 | Miller |
| 2005/0254281 | A1 | 11/2005 | Sawabe et al. |
| 2005/0265172 | A1 | 12/2005 | Stankiewicz |
| 2006/0206221 | A1 | 9/2006 | Metcalf |
| 2007/0256107 | A1 | 11/2007 | Anderson |
| 2008/0015867 | A1 | 1/2008 | Kraemer |
| 2008/0019534 | A1 | 1/2008 | Reichelt et al. |
| 2008/0063211 | A1 | 3/2008 | Kusunoki |
| 2008/0152165 | A1 | 6/2008 | Zacchi |
| 2008/0175394 | A1 | 7/2008 | Goodwin |
| 2009/0147961 | A1 | 6/2009 | Lee |
| 2009/0220095 | A1 | 9/2009 | Oh |
| 2009/0237492 | A1 | 9/2009 | Kikinis |
| 2010/0014692 | A1 | 1/2010 | Schreiner |
| 2010/0064053 | A1 | 3/2010 | Bull |
| 2010/0121647 | A1 | 5/2010 | Beack et al. |
| 2010/0135510 | A1 | 6/2010 | Yoo |
| 2010/0162119 | A1 | 6/2010 | Boustead |
| 2010/0316224 | A1 | 12/2010 | Lau |
| 2010/0324915 | A1 | 12/2010 | Seo |
| 2011/0002469 | A1 | 1/2011 | Ojala |
| 2011/0013790 | A1 | 1/2011 | Hilpert et al. |
| 2011/0040395 | A1 | 2/2011 | Kraemer |
| 2011/0064249 | A1 | 3/2011 | Jang et al. |
| 2011/0069934 | A1 | 3/2011 | Lee |
| 2011/0072147 | A1 | 3/2011 | Kirksey |
| 2011/0305344 | A1 | 12/2011 | Sole |
| 2012/0016680 | A1 | 1/2012 | Thesing |
| 2012/0057715 | A1 | 3/2012 | Johnston |
| 2012/0230497 | A1 | 9/2012 | Dressler |
| 2012/0232910 | A1 | 9/2012 | Dressler |
| 2012/0314875 | A1 | 12/2012 | Lee |
| 2013/0003993 | A1 | 1/2013 | Michalski |
| 2013/0331970 | A1 | 12/2013 | Beckhardt |
| 2014/0133682 | A1 | 5/2014 | Chabanne |
| 2014/0133683 | A1 | 5/2014 | Robinson |
| 2014/0334644 | A1 | 11/2014 | Selig |
| 2015/0255076 | A1 | 9/2015 | Fejzo |

FOREIGN PATENT DOCUMENTS

| | | |
|---|---|---|
| CN | 1964578 A | 5/2007 |
| CN | 101103391 A | 1/2008 |
| CN | 101433099 A | 5/2009 |
| CN | 101484935 | 7/2009 |
| CN | 101542595 | 9/2009 |
| CN | 101542597 | 9/2009 |
| CN | 101583921 | 11/2009 |
| CN | 101641970 | 2/2010 |
| CN | 101911733 | 12/2010 |
| CN | 102007532 | 4/2011 |
| CN | 102099854 | 6/2011 |
| CN | 102100009 | 6/2011 |
| CN | 102124513 | 7/2011 |
| CN | 102144410 | 8/2011 |
| CN | 101473645 B | 9/2011 |
| CN | 102428514 | 4/2012 |
| CN | 101689368 B | 8/2012 |
| CN | 102754159 | 10/2012 |
| CN | 101632118 B | 6/2013 |
| CN | 102100088 B | 10/2013 |
| CN | 102549655 B | 9/2014 |
| CN | 101542596 B | 5/2016 |
| EP | 2111061 | 10/2009 |
| EP | 2112651 A1 | 10/2009 |
| EP | 2146522 | 1/2010 |
| EP | 1853093 B1 | 9/2011 |
| EP | 2690621 | 1/2014 |
| JP | 2011528200 | 11/2011 |
| JP | 2014522155 A | 8/2014 |
| KR | 100802179 | 2/2008 |
| KR | 20090110233 A | 10/2009 |
| KR | 20110037974 A | 4/2011 |
| TW | 201015541 A | 4/2010 |
| WO | 200165888 W | 9/2001 |
| WO | WO2007078254 | 7/2007 |
| WO | 2008006108 A2 | 1/2008 |
| WO | 2008100100 A1 | 8/2008 |
| WO | 2008120933 A1 | 10/2008 |
| WO | 2009084917 | 7/2009 |
| WO | WO2010006719 | 1/2010 |
| WO | 2010033384 A1 | 3/2010 |
| WO | 2010041877 A2 | 4/2010 |
| WO | WO2011020065 | 2/2011 |
| WO | WO2011119401 | 9/2011 |
| WO | WO2012075246 | 7/2012 |
| WO | 2012125855 | 9/2012 |
| WO | WO2012122397 | 9/2012 |
| WO | 2013006325 A1 | 1/2013 |
| WO | WO2013006330 | 1/2013 |
| WO | WO2013006338 A2 | 1/2013 |
| WO | 2013073810 | 5/2013 |
| WO | WO2013181272 | 12/2013 |
| WO | WO2013192111 | 12/2013 |
| WO | WO2014036121 | 3/2014 |
| WO | WO2014165326 | 10/2014 |

OTHER PUBLICATIONS

Aggoun, A. et al "Live Immerse Video-Audio Interactive Multimedia" Mar. 2010, IEEE International Symposium on Broadband Multimedia Systems and Broadcasting, pp. 1-5.

(56) References Cited

OTHER PUBLICATIONS

ATSC Standard A52/A: "Digital Audio Compression Standard (AC-3), Revision A" Advanced Television Systems Committe, Aug. 20, 2001.
Barnard, A. et al "Evaluation of Crowd Noise in Beaver Stadium During a 2009 Penn State Football Game", Lay Language Papers, Acoustical Society of America, Apr. 19-23, 2010, Baltimore, USA.
Dolby, "AC-3 Compressed Audio (Dolby Digital), Revision A", pp. 1-4, Mar. 8, 2011.
Eckel, Gerhard "Immersive Audio-Augmented Environments: the Listen project" IEEE Fifth International Conference on Information Visualisation, Jul. 25-27, 2001, pp. 571-573.
Fielder, L. et al "Introduction to Dolby Digital Plus, an Enhancement to the DOlby Digital Coding System" AES Convention Paper, 117th AES Convention, Oct. 28, 2004.
Fielder, L. et al "Professional Audio Coder Optimized for Use with Video" AES Preprint, 5033, 107th AES Conference, Sep. 1, 1999.
Jot, J-M. "Interactive 3D Audio Rendering in Flexible Playback Configurations" IEEE Signal & Information Processing Association Annual Summit and Conference, Dec. 3-6, 2012, pp. 1-9.
Terrenghi, L. et al "Tailored Audio Augmented Environments for Museums" Jan. 2004, International Conference on Intelligent User Interfaces pp. 334-336.
Truman, M. et al "Efficient Bit Allocation, Quantization, and Coding in an Audio Distribution System" AES Convention 107, Sep. 1, 1999.

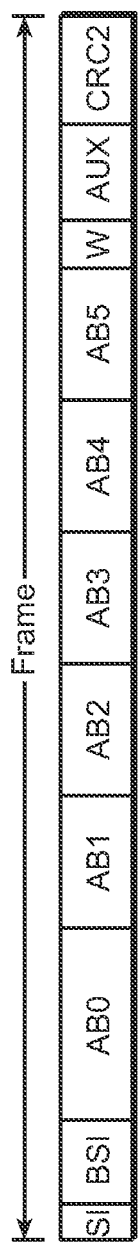
FIG. 1
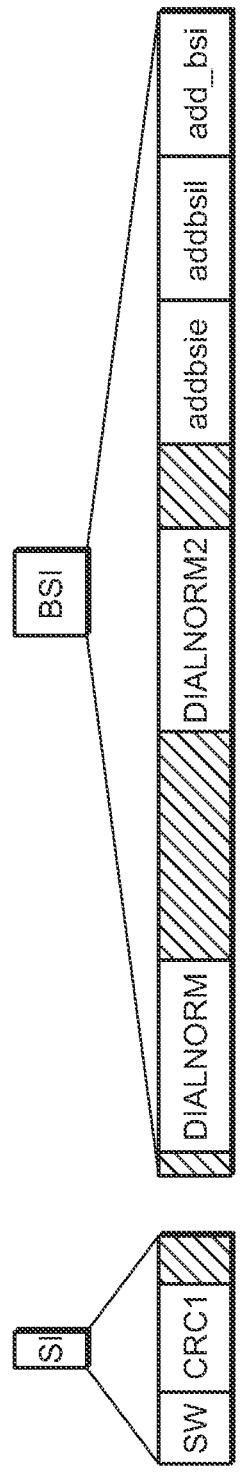
FIG. 2
FIG. 3
FIG. 4

METHODS AND SYSTEMS FOR GENERATING AND RENDERING OBJECT BASED AUDIO WITH CONDITIONAL RENDERING METADATA

CROSS-REFERENCE TO RELATED APPLICATIONS

The present application is a continuation of U.S. patent application Ser. No. 18/159,95, filed Jan. 25, 2023, which is a continuation of U.S. patent application Ser. No. 16/996,367, filed Aug. 18, 2020 (now U.S. Pat. No. 11,568,881, which is a divisional of U.S. patent application Ser. No. 16/512,061, filed Jul. 15, 2019 (now U.S. Pat. No. 10,748,547), which is a divisional of U.S. patent application Ser. No. 15/882,589 filed Jan. 29, 2018, (now U.S. Pat. No. 10,388,291), which is a divisional of U.S. patent application Ser. No. 14/781,544, filed Sep. 30, 2015 (now U.S. Pat. No. 9,881,622), which is the United States National Stage of International Patent Application No. PCT/US2014/032808, filed Apr. 3, 2014, which claims priority to U.S. Provisional Patent Application No. 61/807,922, filed Apr. 3, 2013 and U.S. Provisional Patent Application No. 61/832,397, filed Jun. 7, 2013, all of which are incorporated herein by reference in their entirety.

TECHNICAL FIELD

The invention pertains to audio signal processing, and more particularly, to encoding, decoding, and interactive rendering of audio data bitstreams which include audio content (indicative of at least one speaker channel and at least one audio object channel), and metadata which supports conditional rendering of the audio content in a manner dependent on playback speaker configuration. Some embodiments of the invention generate, decode, and/or render audio data in one of the formats known as Dolby Digital (AC-3), Dolby Digital Plus (Enhanced AC-3 or E-AC-3), or Dolby E.

BACKGROUND OF THE INVENTION

Dolby, Dolby Digital, Dolby Digital Plus, and Dolby E are trademarks of Dolby Laboratories Licensing Corporation. Dolby Laboratories provides proprietary implementations of AC-3 and E-AC-3 known as Dolby Digital and Dolby Digital Plus, respectively.

Although the invention is not limited to use in encoding audio data in accordance with the E-AC-3 (or AC-3 or Dolby E) format, or delivering, decoding or rendering E-AC-3, AC-3, or Dolby E encoded data, for convenience it will be described in embodiments in which it encodes an audio bitstream in accordance with the E-AC-3 or AC-3 or Dolby E format, and delivers, decodes, and renders such a bitstream.

A typical stream of audio data includes both audio content (e.g., one or more channels of audio content) and metadata indicative of at least one characteristic of the audio content. For example, in an AC-3 bitstream there are several audio metadata parameters that are specifically intended for use in changing the sound of the program delivered to a listening environment.

An AC-3 or E-AC-3 encoded bitstream comprises metadata and can comprise one to six channels of audio content. The audio content is audio data that has been compressed using perceptual audio coding. Details of AC-3 coding are well known and are set forth in many published references including the following:

ATSC Standard A52/A: Digital Audio Compression Standard (AC-3), Revision A, Advanced Television Systems Committee, 20 Aug. 2001; and U.S. Pat. Nos. 5,583,962; 5,632,005; 5,633,981; 5,727,119; and 6,021,386.

Details of Dolby Digital Plus (E-AC-3) coding are set forth in, for example, "Introduction to Dolby Digital Plus, an Enhancement to the Dolby Digital Coding System," AES Convention Paper 6196, 117th AES Convention, Oct. 28, 2004.

Details of Dolby E coding are set forth in "Efficient Bit Allocation, Quantization, and Coding in an Audio Distribution System", AES Preprint 5068, 107th AES Conference, August 1999 and "Professional Audio Coder Optimized for Use with Video", AES Preprint 5033, 107th AES Conference August 1999.

Each frame of an AC-3 encoded audio bitstream contains audio content and metadata for 1536 samples of digital audio. For a sampling rate of 48 kHz, this represents 32 milliseconds of digital audio or a rate of 31.25 frames per second of audio.

Each frame of an E-AC-3 encoded audio bitstream contains audio content and metadata for 256, 512, 768 or 1536 samples of digital audio, depending on whether the frame contains one, two, three or six blocks of audio data respectively. For a sampling rate of 48 kHz, this represents 5.333, 10.667, 16 or 32 milliseconds of digital audio respectively or a rate of 189.9, 93.75, 62.5 or 31.25 frames per second of audio respectively.

As indicated in FIG. 1, each AC-3 frame is divided into sections (segments), including: a Synchronization Information (SI) section which contains (as shown in FIG. 2) a synchronization word (SW) and the first of two error correction words (CRC1); a Bitstream Information (BSI) section which contains most of the metadata; six Audio Blocks (AB0 to AB5) which contain data compressed audio content (and can also include metadata); waste bits (W) which contain any unused bits left over after the audio content is compressed; an Auxiliary (AUX) information section which may contain more metadata; and the second of two error correction words (CRC2).

As indicated in FIG. 4, each E-AC-3 frame is divided into sections (segments), including: a Synchronization Information (SI) section which contains (as shown in FIG. 2) a synchronization word (SW); a Bitstream Information (BSI) section which contains most of the metadata; between one and six Audio Blocks (AB0 to AB5) which contain data compressed audio content (and can also include metadata); waste bits (W) which contain any unused bits left over after the audio content is compressed; an Auxiliary (AUX) information section which may contain more metadata; and an error correction word (CRC).

In an AC-3 (or E-AC-3) bitstream there are several audio metadata parameters that are specifically intended for use in changing the sound of the program delivered to a listening environment. One of the metadata parameters is the DIALNORM parameter, which is included in the BSI segment.

As shown in FIG. 3, the BSI segment of an AC-3 frame (or an E-AC-3 frame) includes a five-bit parameter ("DIALNORM") indicating the DIALNORM value for the program. A five-bit parameter ("DIALNORM2") indicating the DIALNORM value for a second audio program carried in the same AC-3 frame is included if the audio coding mode ("acmod") of the AC-3 frame is "0", indicating that a dual-mono or "1+1" channel configuration is in use.

The BSI segment also includes a flag ("addbsie") indicating the presence (or absence) of additional bit stream information following the "addbsie" bit, a parameter ("addbsil") indicating the length of any additional bit stream information following the "addbsil" value, and up to 64 bits of additional bit stream information ("addbsi") following the "addbsil" value.

The BSI segment includes other metadata values not specifically shown in FIG. 3.

It has been proposed to include metadata of other types in audio bitstreams. For example, methods and systems for generating, decoding, and processing audio bitstreams including metadata indicative of the processing state (e.g., the loudness processing state) and characteristics (e.g., loudness) of audio content are described in PCT International Application Publication Number WO 2012/075246 A2, having international filing date Dec. 1, 2011, and assigned to the assignee of the present application. This reference also describes adaptive processing of the audio content of the bitstreams using the metadata, and verification of validity of the loudness processing state and loudness of audio content of the bitstreams using the metadata.

Methods for generating and rendering object based audio programs are also known. During generation of such programs, it may be assumed that the loudspeakers to be employed for rendering are located in arbitrary locations in the playback environment (or that the speakers are in a symmetric configuration in a unit circle). It need not be assumed that the speakers are necessarily in a (nominally) horizontal plane or in any other predetermined arrangements known at the time of program generation. Typically, metadata included in the program indicates rendering parameters for rendering at least one object of the program at an apparent spatial location or along a trajectory (in a three dimensional volume), e.g., using a three-dimensional array of speakers. For example, an object channel of the program may have corresponding metadata indicating a three-dimensional trajectory of apparent spatial positions at which the object (indicated by the object channel) is to be rendered. The trajectory may include a sequence of "floor" locations (in the plane of a subset of speakers which are assumed to be located on the floor, or in another horizontal plane, of the playback environment), and a sequence of "above-floor" locations (each determined by driving a subset of the speakers which are assumed to be located in at least one other horizontal plane of the playback environment). Examples of rendering of object based audio programs are described, for example, in PCT International Application No. PCT/US2001/028783, published under International Publication No. WO 2011/119401 A2 on Sep. 29, 2011, and assigned to the assignee of the present application.

Above-cited U.S. Provisional Patent Application No. 61/807,922 and above-cited U.S. Provisional Patent Application No. 61/832,397 describe object based audio programs which are rendered so as to provide an immersive, personalizable perception of the program's audio content. The content may be indicative of the atmosphere at (i.e., sound occurring in or at) and/or commentary on a spectator event (e.g., a soccer or rugby game, or another sporting event). The audio content of the program may be indicative of multiple audio object channels (e.g., indicative of user-selectable objects or object sets, and typically also a default set of objects to be rendered in the absence of object selection by the user) and at least one bed of speaker channels. The bed of speaker channels may be a conventional mix (e.g., a 5.1 channel mix) of speaker channels of a type that might be included in a conventional broadcast program which does not include an object channel.

Above-cited U.S. Provisional Patent Applications No. 61/807,922 and No. 61/832,397 describe object related metadata delivered as part of an object based audio program which provides mixing interactivity on the playback side, including by allowing an end user to select a mix of audio content of the program for rendering, instead of merely allowing playback of a pre-mixed soundfield. For example, a user may select among rendering options provided by metadata of a typical embodiment of the inventive program to select a subset of available object channels for rendering, and optionally also the playback level of at least one audio object (sound source) indicated by the object channel(s) to be rendered. The spatial location at which each selected sound source is rendered may be predetermined by metadata included in the program, but in some embodiments can be selected by the user (e.g., subject to predetermined rules or constraints). In some embodiments, metadata included in the program allows user selection from among a menu of rendering options (e.g., a small number of rendering options, for example, a "home team crowd noise" object, a "home team crowd noise" and a "home team commentary" object set, an "away team crowd noise" object, and an "away team crowd noise" and "away team commentary" object set). The menu may be presented to the user by a user interface of a controller, and the controller may be coupled to a set top device (or other device) configured to decode and render (at least partially) the object based program. Metadata included in the program may otherwise allow user selection from among a set of options as to which object(s) indicated by the object channels should be rendered, and as to how the object(s) to be rendered should be configured.

U.S. Provisional Patent Applications No. 61/807,922 and No. 61/832,397 describe an object based audio program which is an encoded audio bitstream indicative of at least some of the program's audio content (e.g., a bed of speaker channels and at least some of the program's object channels) and object related metadata. At least one additional bitstream or file may be indicative of some of the program's audio content (e.g., at least some of the object channels) and/or object related metadata. In some embodiments, object related metadata provides a default mix of object content and bed (speaker channel) content, with default rendering parameters (e.g., default spatial locations of rendered objects). In some embodiments, object related metadata provides a set of selectable "preset" mixes of object channel and speaker channel content, each preset mix having a predetermined set of rendering parameters (e.g., spatial locations of rendered objects). In some embodiments, object related metadata of a program (or a preconfiguration of the playback or rendering system, not indicated by metadata delivered with the program) provides constraints or conditions on selectable mixes of object channel and speaker channel content.

U.S. Provisional Patent Applications No. 61/807,922 and No. 61/832,397 also describe an object based audio program including a set of bitstreams (sometimes referred to as "substreams") which are generated and transmitted in parallel. Multiple decoders may be employed to decode them (e.g., if the program includes multiple E-AC-3 substreams the playback system may employ multiple E-AC-3 decoders to decode the substreams). Each substream may include synchronization words (e.g., time codes) to allow the substreams to be synchronized or time aligned with each other.

U.S. Provisional Patent Applications No. 61/807,922 and No. 61/832,397 also describe an object based audio program which is or includes at least one AC-3 (or E-AC-3) bitstream, and includes one or more data structures referred to as containers. Each container which includes object channel content (and/or object related metadata) is included in an auxdata field (e.g., the AUX segment shown in FIG. 1 or FIG. 4) at the end of a frame of the bitstream, or in a "skip fields" segment of the bitstream. Also described is an object based audio program which is or includes a Dolby E bitstream, in which the object channel content and object related metadata (e.g., each container of the program which includes object channel content and/or object related metadata) is included in bit locations of the Dolby E bitstream that conventionally do not carry useful information. U.S. Provisional Application No. 61/832,397 also describes an object based audio program including at least one set of speaker channels, at least one object channel, and metadata indicative of a layered graph (a layered "mix graph") indicative of selectable mixes (e.g., all selectable mixes) of the speaker channels and object channel(s). The mix graph may be indicative of each rule applicable to selection of subsets of the speaker and object channels, is indicative of nodes (each of which may be indicative of a selectable channel or set of channels, or a category of selectable channels or set of channels) and connections between the nodes (e.g., control interfaces to the nodes and/or rules for selecting channels). The mix graph may indicate essential data (a "base" layer) and optional data (at least one "extension" layer), and where the mix graph is representable as a tree graph, the base layer can be a branch (or two or more branches) of the tree graph, and each extension layer can be another branch (or set of branches) of the tree graph.

As noted, it has been proposed to include, in an object based audio program, object related metadata which indicates rendering parameters for rendering at least one object (indicated by an object channel of the program) at an apparent spatial location or along an apparent trajectory (in a three dimensional volume) using an array of speakers. For example, an object channel of the program may have corresponding metadata indicating a three-dimensional trajectory of apparent spatial positions at which the corresponding object is to be rendered. The trajectory may include a sequence of "floor" locations in a "floor" plane (where the "floor" plane is a horizontal plane which nominally includes the expected positions of the listener's ears) of the playback environment, and a sequence of "above-floor" locations above the floor plane. It has been proposed to render an object of an object based program at above-floor locations, including by generating at least one speaker feed for driving at least one "above-floor" speaker (of a playback speaker array) which is assumed to be located above the floor plane in the playback environment. Such an above-floor speaker is sometimes referred to herein as a "height" speaker.

Traditionally, audio downmixing of a multi-channel audio program is performed in accordance with a predetermined formula, to collapse (downmix) a first set of channels of the program (N channels indicative of a first soundfield, where N is an integer) down to a second set of channels (M channels indicative of a downmixed soundfield, where M is an integer less than N) for playback by an available speaker array comprising M speakers (e.g., a stereo television speaker array consisting of two speakers). During playback after downmixing, the available speaker array emits sound indicative of the downmixed soundfield. Typically, traditional downmixing of this type includes in the second set of channels (i.e., the downmix) audio content of all the channels in the first set.

If no above-floor ("height") speaker is present in the playback system speaker array, a traditional downmixing technique (of the type mentioned above) could be employed to downmix content of an object channel with content of speaker channels of the program (where the speaker channel content is intended to be played by floor speakers of the playback speaker array), so that the resulting downmixed sound is emitted only from floor speakers of the playback speaker array. However, the inventors have recognized that because the content of the above-floor object channel would be downmixed into the content of the original speaker channels, the traditional downmixing would undesirably result in cacophonous sound upon playback of the resulting downmix (e.g., the above-floor content would be perceived as interfering with original speaker channel content).

The inventors have also recognized that a traditional downmixing technique (of the above-mentioned type) has other limitations and disadvantages, not necessarily related to the presence or absence of height speakers in the playback speaker array. For example, the inventors have recognized that, even in traditional 5.1 channel audio production, compromises are often made to preserve a reasonable soundfield for a stereo downmix. For example, a broadcaster may want to place a commentary (or other dialog element) in the surround channels of a 5.1 channel program, but choose not to do so since a traditionally implemented stereo downmix of the desired representation does not provide a pleasing or representative experience to stereo television viewers.

Until the present invention, it had not been known how to render downmixes of selected channels (e.g., object and speaker channels) of an object based audio program, in a manner which ensures that the downmixes are compliant with predetermined downmixing constraints (e.g., one or more downmixing constraints specified by the entity which generates and broadcasts the program, or by the program content creator) based on playback speaker array configuration (e.g., to avoid cacophonous or otherwise undesirable downmixed sound upon playback). Different embodiments of the invention apply to any and all conditions where the program is indicative of more audio channels than those available in the final reproduction environment (i.e., all conditions in which the program includes more channels (object channels and/or speaker channels) than the number of speakers, of the playback speaker array, to be driven).

BRIEF DESCRIPTION OF EMBODIMENTS OF THE INVENTION

A class of embodiments of the invention includes methods for generation and conditional rendering of interactive object based audio, based on playback speaker array configuration (where playback speaker array "configuration" denotes in this context at least one configuration attribute, e.g., the number of speakers in the array and the actual or assumed placement of each speaker in the playback environment).

Object related metadata in an object based audio program (generated in accordance with some embodiments of the invention) indicates rendering parameters for rendering at least one object (indicated by an object channel of the program) at an apparent spatial location, or along an apparent trajectory (in a three dimensional volume), using a playback system speaker array. For example, an object channel of the program may have corresponding metadata indicating a three-dimensional trajectory of apparent spatial positions at which the corresponding object is to be rendered. The trajectory may include a sequence of "floor" locations (nominally in the plane of the floor of the playback environment, which is assumed to coincide at least approximately with the horizontal plane of the listener's ears), and a sequence of "above-floor" locations above the floor plane. To render the object at above-floor locations, at least one speaker feed is generated for driving at least one speaker of the playback speaker array which is assumed to be located above the floor plane in the playback environment.

A class of embodiments comprises methods for generation and/or rendering of an object based audio program which includes conditional rendering metadata corresponding to at least one object channel (e.g., an above-floor object channel) of the program. Thus, each audio object indicated by each such object channel has corresponding conditional rendering metadata. For example, in some embodiments an audio object having corresponding conditional rendering metadata may be an above-floor object.

In a class of embodiments, the conditional rendering metadata is object related metadata indicative of at least one rendering constraint, based on playback speaker array configuration, which applies to each corresponding object channel (i.e., each object channel corresponding to the conditional rendering metadata). An example of such a rendering constraint is a prohibition against rendering a corresponding object channel when the playback speaker array configuration is of a specific type. A playback system (having knowledge that its playback speaker array is of this specific type) may be configured (e.g., preconfigured, or configured in response to metadata of the program) to operate in response to conditional rendering metadata indicative of such rendering constraint by preventing implementation of rendering of content of the object channel into a speaker feed (for use in driving a playback speaker). Another example of a rendering constraint indicated by the conditional rendering metadata generated (by a method in the class of embodiments) is an indication of at least one permissible type of rendering of content of a corresponding object channel when the playback speaker array configuration is of a specific type. Other examples of rendering constraints indicated by conditional rendering metadata are indications of placement, level, size, and other attributes (e.g., special effects processing to be performed on) with (or as to which) content of a corresponding object channel is included in each speaker feed generated during rendering of the content, so that when the rendered content is played by the playback speaker array it will be perceived as emitting from an apparent source (object) with the spatial position, level, size, and/or other attributes indicated by the metadata.

In some embodiments, the conditional rendering metadata is object related metadata indicative of at least one rendering restraint which is a downmixing constraint, based on playback speaker array configuration, which applies to each corresponding object channel (i.e., each object channel corresponding to the conditional rendering metadata). An example of such a downmixing constraint is a prohibition against downmixing of a corresponding object channel when the playback speaker array configuration is of a specific type. A playback system (having knowledge that its playback speaker array is of this specific type) may be configured (e.g., preconfigured, or configured in response to metadata of the program) to operate in response to conditional rendering metadata indicative of such downmixing constraint by preventing implementation of any downmix of the object channel into a speaker channel of the program. Another example of a downmixing constraint indicated by the conditional rendering metadata generated (by a method in the class of embodiments) is an indication of at least one permissible downmix (or type of downmix) including a corresponding object channel when the playback speaker array configuration is of a specific type. Other examples of downmixing constraints indicated by conditional rendering metadata are indications of placement, level, size, and other attributes of (e.g., special effects processing to be performed on) an audio object (in a downmix of the corresponding object channel into one or more speaker channels) based on playback speaker configuration.

It should be appreciated that the expression "to perform a downmix" of or on (or "to downmix" or to "render a downmix" of or on) N channels of an object based audio program is used herein in a broad sense to denote determination or generation of M speaker feeds (indicative of content of at least some, and typically all, of the N channels of the program) for driving M speakers of a playback speaker array, where N is an integer and M is an integer less than N. In one example, conditional rendering metadata which pertains to an object channel (of a program including N channels) is indicative of at least one downmixing constraint (based on playback speaker array configuration) in the sense that a first subset of the conditional rendering metadata indicates some attribute of (or rule pertaining to) the generation of M1 speaker feeds for driving a first array of M1 playback speakers such that the M1 speaker feeds are indicative of a downmix of content of the program including content of the object channel, and a second subset of the conditional rendering metadata indicates some attribute of (or rule pertaining to) generation of M2 speaker feeds for driving a different array of M2 playback speakers such that the M2 speaker feeds are indicative of another downmix of content of the program including content of the object channel, where M1 is not equal to M2. In this example, rendering of a downmix on N channels of a program for playback by the first array of M1 speakers would typically include steps of selecting the first subset of the conditional rendering metadata (rather than the second subset of the conditional rendering metadata) and using the selected first subset of the conditional rendering metadata to determine or generate the appropriate M1 speaker feeds.

In a class of embodiments, the invention is a method for generating an object based audio program, said method including steps of:
  generating conditional rendering metadata corresponding to at least one object channel, such that the conditional rendering metadata is indicative of at least one rendering constraint (e.g., a downmixing constraint), based on playback speaker array configuration, which applies to said at least one object channel;
  determining a set of audio channels including said at least one object channel (and optionally also at least one speaker channel); and
  generating the object based audio program such that said object based audio program is indicative of the set of audio channels and the conditional rendering metadata, and such that content of at least one audio channel of the set of audio channels is renderable, in a manner compliant with the at least one rendering constraint, by a playback system in response to at least some of the conditional rendering metadata.

Optionally, the conditional rendering metadata is also indicative of at least one rendering rule (e.g., at least one downmix rule), based on playback speaker array configuration, for rendering (e.g., implementing a downmix of)

audio channels of the program. For example, the conditional rendering metadata may indicate the following rules:

each object channel of the program of a first type (e.g., as indicated by at least some conditional rendering metadata of the program) should be downmixed into any speaker channel specified by any user-selected (or default) mix of content of the program if the playback speaker array includes at least one above-floor speaker, each object channel of the program of the first type should be ignored (i.e., should not be included in any downmix) by the playback system if the playback speaker array does not include at least one above-floor speaker, and each object channel of the program of a second type (e.g., as indicated by at least some conditional rendering metadata of the program) should be downmixed into any speaker channel specified by any user-selected (or default) mix of content of channels of the program regardless of configuration of the playback speaker array.

It is contemplated that generation of an object based audio program in accordance with some embodiments of the invention includes a step of selecting a subset of available (i.e., previously generated) conditional rendering metadata and including the selected conditional rendering metadata (but not unselected conditional rendering metadata) in the program.

In other embodiments, the invention is a method of rendering audio content determined by an object based audio program, wherein the program is indicative of conditional rendering metadata corresponding to at least one object channel, and a set of audio channels including the at least one object channel (and optionally also at least one speaker channel), and wherein the conditional rendering metadata is indicative of at least one rendering constraint (e.g., at least one downmixing constraint), based on playback speaker array configuration, which applies to said at least one object channel, said method including steps of:

(a) providing the object based audio program to an audio processing unit; and (b) in the audio processing unit, parsing the conditional rendering metadata and the set of audio channels, and rendering content of at least one audio channel of the set of audio channels, in a manner compliant with the at least one rendering constraint, in response to at least some of the conditional rendering metadata.

In some such embodiments, the set of audio channels includes at least one speaker channel, and step (b) includes a step of selecting at least one object channel of the set of audio channels, and mixing each selected object channel of the set with at least one speaker channel of the set to generate a downmix of content of said each selected object channel and the at least one speaker channel. Typically, the downmix consists of a set of N downmixed speaker channels, where N is a positive integer, and step (b) includes a step of causing N speakers of a playback speaker array to emit sound by driving the speakers with speaker feeds generated from the downmixed speaker channels.

Optionally, the conditional rendering metadata is also indicative of at least one rendering rule (e.g., at least one downmix rule), based on playback speaker array configuration, and the rendering performed in step (b) is compliant with the rendering rule.

An object based audio program generated in accordance with typical embodiments of the invention may be rendered to cause sound indicative of downmixed content (e.g., of object channels and/or speaker channels) of the program played by a playback speaker array to be perceived as emitting from different apparent source locations within the sound reproduction (playback) environment. For an interactive presentation, objects determined by selected ones of selectable object channels are rendered at locations (e.g., a set of different static locations, corresponding to different ones of a set of selected objects) within the rendered soundfield, such that audio content of each selected object channel is rendered so as to be perceived as emitting from an apparent source location (or trajectory of locations) determined by object related metadata corresponding to the selected object channel. For example, an immersive sound mix determined from an object based audio program may indicate sound which is in turn indicative of a "public address" audio object (determined by a selected object channel of the program) so as to be perceived as emitting from an apparent source location above the assumed listener's position within the reproduction environment to give the listener (consumer) the experience of being in a stadium while announcements are emitted from a public address loudspeaker mounted above the listener. Such a public address audio object may be selected for rendering and playback by a speaker array comprising at least one above-floor speaker physically located in a horizontal plane (sometimes referred to as an "above-floor" or "height" plane) above a "floor" plane, where the "floor" plane is a horizontal plane which nominally includes the expected positions of the listener's ears. Typically, other speakers of the playback speaker array are nominally located in the floor plane.

When an audio object (e.g., the public address audio object of the previous example) is determined by a discrete object channel of an object based audio program, and corresponding metadata of the program indicates an above-floor source location (or trajectory of above-floor source locations) from which the corresponding sound should be perceived as emitting when the object channel is selected (and rendered and played), we refer to the audio object as an "above-floor" (or "height") object, and to the object channel which indicates the above-floor object as an "above-floor" (or "height") object channel. An above-floor audio object is typically rendered and played so that the resulting sound is emitted from at least one above-floor (or "height") speaker of the playback system speaker array.

If no above-floor ("height") speaker is present in the playback system speaker array, a traditional downmixing technique (of the type mentioned above) may be employed to downmix content of a selected "above-floor" object channel with content of speaker channels of the program (where the speaker channel content is intended to be played by floor speakers of the playback speaker array), so that the resulting downmixed sound is emitted only from floor speakers of the playback speaker array. However, because the content of the above-floor object channel would be downmixed into the content of the speaker channels, the downmixing would undesirably result in a cacophonous-sounding mix (e.g., in which the above-floor content would be perceived as interfering with original speaker channel content).

Using conditional rendering metadata included in an object-based audio program in accordance with some embodiments of the invention, a rendering system can make intelligent decisions as to which audio objects indicated by the program may or should be placed in which speaker channels of a downmix (and/or which audio objects should be omitted from which speaker channels of a downmix) of channels of the program, and at what volume each object should be downmixed with other audio content of the program, when a downmix of channels of the program is to be generated for playback by available speakers of the playback system. Typical embodiments of the invention give sound mixers artistic flexibility to determine a good sounding mix (of content of an object based audio program) for each contemplated playback speaker array configuration without compromises that would otherwise result from conventional downmixing, and to include corresponding conditional rendering metadata in the to enable rendering of each such mix.

Conditional rendering of object channel content of an object based audio program in response to conditional rendering metadata included in the program (assuming knowledge of the available playback speaker array configuration), in accordance with typical embodiments of the invention, allows one or both of: automatic selection of a downmix rendering option based on a specific playback speaker array configuration (e.g., a set top box having a dedicated stereo output may be pre-configured so that its object-based audio rendering engine always selects "stereo" conditional rendering metadata of an input object based program, and uses the selected "stereo" conditional rendering metadata to generate stereo speaker feeds in response to the program); and/or user selection from among a menu of rendering options (e.g., downmix rendering options) available given a specific playback speaker array configuration. For example, the menu may include a small number of selectable downmix rendering options given that the playback speaker array consists only of floor speakers in a 5.1 channel configuration, including the following options: a "home team commentary" downmix including content of a bed of speaker channels downmixed with a "home team commentary" object, an "away team commentary" downmix including content of a bed of speaker channels downmixed with an "away team commentary" object, and a "home team commentary plus home team crowd noise" downmix including content of a bed of speaker channels downmixed with a "home team commentary" object and a "home team crowd noise" object.

For another example, the menu may include a larger number of selectable downmix rendering options given that the playback speaker array consists of floor speakers (e.g., in a 5.1 channel configuration) and a set of height (above-floor) speakers, including the following options: a "home team commentary" floor downmix including content of a bed of speaker channels downmixed with a "home team commentary" object (for driving only floor speakers of the array), an "away team commentary" floor downmix including content of a bed of speaker channels downmixed with an "away team commentary" object (for driving only floor speakers of the array), a "home team commentary plus home team crowd noise" floor downmix including content of a bed of speaker channels downmixed with a "home team commentary" object and a "home team crowd noise" object (for driving only floor speakers of the array), and a "home team commentary plus home team crowd noise plus public announcement" downmix including content of a bed of speaker channels downmixed with a "home team commentary" object, a "home team crowd noise" object, and a public announcement object (for driving all speakers of the array, but with content of the public announcement object channel included only in downmix speaker feeds which drive above-floor speakers of the array, and all other content of the downmix included only in downmix speaker feeds which drive floor speakers of the array).

The menu of rendering options (e.g., downmix rendering options) may be presented to the user by a user interface of a controller, and the controller may be coupled to a set top device (or other device) configured to decode and render (at least partially) the object based program. Metadata (included the above-noted conditional rendering metadata) included in the program may allow user selection from among a set of options as to which object(s) indicated by the program should be rendered, and as to how the object(s) to be rendered should be configured.

In some embodiments, the conditional rendering metadata specifies at least the following attributes of each selectable downmix (of audio content of the program) selectable by a user (e.g., each selectable downmix indicated by a menu of downmix rendering options), given the availability of a playback speaker array having a specific corresponding configuration (of a set of possible playback speaker array configurations):

presence (i.e., for each object channel, an indication as to whether the object channel should be present in the downmix for rendering by a playback speaker array having the corresponding configuration);

position within soundfield (i.e., for each object channel to be included in a downmix for rendering by a playback speaker array having the corresponding configuration, an indication of apparent spatial location from which the corresponding sound should be perceived as emitting when speaker feeds determined by the downmix drive the available speakers);

gain (i.e., for each object channel to be included in a downmix for rendering by a playback speaker array having the corresponding configuration, an indication of the gain to be applied to the corresponding audio samples when generating the downmix); and effects (i.e., for each object channel to be included in a downmix for rendering by a playback speaker array having the corresponding configuration, an indication each type of special effects processing (if any) to be applied to the corresponding audio samples when generating the downmix. Examples of such processing include but are not limited to divergence processing and reverb application).

Another aspect of the invention is an audio processing unit (APU) configured to perform any embodiment of the inventive method. In another class of embodiments, the invention is an APU including a buffer memory (buffer) which stores (e.g., in a non-transitory manner) at least one frame or other segment (including audio content of speaker channels and at least one object channel, and object related metadata including conditional rendering metadata) of an object based audio program which has been generated by any embodiment of the inventive method. Examples of APUs include, but are not limited to encoders (e.g., transcoders), decoders, codecs, pre-processing systems (pre-processors), post-processing systems (post-processors), audio bitstream processing systems, and combinations of such elements.

Aspects of the invention include a system or device configured (e.g., programmed) to perform any embodiment of the inventive method, and a computer readable medium (e.g., a disc) which stores code (e.g., in a non-transitory manner) for implementing any embodiment of the inventive method or steps thereof. For example, the inventive system can be or include a programmable general purpose processor, digital signal processor, or microprocessor, programmed with software or firmware and/or otherwise configured to perform any of a variety of operations on data, including an embodiment of the inventive method or steps thereof. Such a general purpose processor may be or include a computer system including an input device, a memory, and processing circuitry programmed (and/or otherwise configured) to perform an embodiment of the inventive method (or steps thereof) in response to data asserted thereto.

BRIEF DESCRIPTION OF THE DRAWINGS

FIG. 1 is a diagram of an AC-3 frame, including the segments into which it is divided.

FIG. 2 is a diagram of the Synchronization Information (SI) segment of an AC-3 frame, including segments into which it is divided.

FIG. 3 is a diagram of the Bitstream Information (BSI) segment of an AC-3 frame, including segments into which it is divided.

FIG. 4 is a diagram of an E-AC-3 frame, including segments into which it is divided.

NOTATION AND NOMENCLATURE

Figure 5:
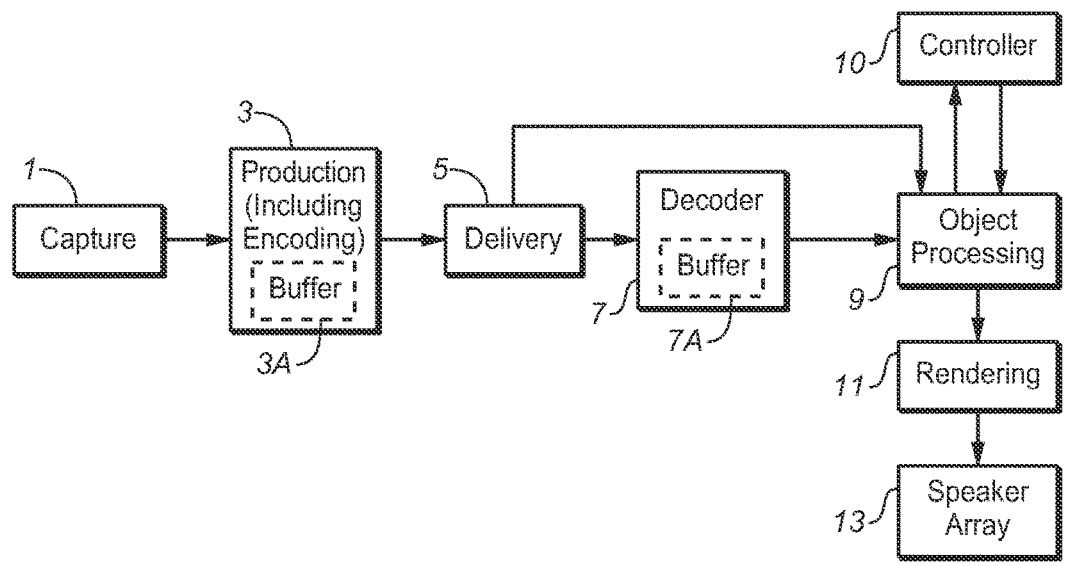
FIG. 5 is a block diagram of an embodiment of a system, in which one or more of the elements of the system may be configured in accordance with an embodiment of the invention.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the expression "audio video receiver" (or "AVR") denotes a receiver in a class of consumer electronics equipment used to control playback of audio and video content, for example in a home theater.

Throughout this disclosure including in the claims, the expression "soundbar" denotes a device which is a type of consumer electronics equipment (typically installed in a home theater system), and which includes at least one speaker (typically, at least two speakers) and a subsystem for rendering audio for playback by each included speaker (or for playback by each included speaker and at least one additional speaker external to the soundbar).

Throughout this disclosure including in the claims, the expressions "audio processor" and "audio processing unit" are used interchangeably, and in a broad sense, to denote a system configured to process audio data. Examples of audio processing units include, but are not limited to encoders (e.g., transcoders), decoders, codecs, pre-processing systems, post-processing systems, and bitstream processing systems (sometimes referred to as bitstream processing tools).

Throughout this disclosure including in the claims, the expression "metadata" (e.g., as in the expression "processing state metadata") refers to separate and different data from corresponding audio data (audio content of a bitstream which also includes metadata). Metadata is associated with audio data, and indicates at least one feature or characteristic of the audio data (e.g., what type(s) of processing have already been performed, or should be performed, on the audio data, or the trajectory of an object indicated by the audio data). The association of the metadata with the audio data is time-synchronous. Thus, present (most recently received or updated) metadata may indicate that the corresponding audio data contemporaneously has an indicated feature and/or comprises the results of an indicated type of audio data processing.

Throughout this disclosure including in the claims, the term "couples" or "coupled" is used to mean either a direct or indirect connection. Thus, if a first device couples to a second device, that connection may be through a direct connection, or through an indirect connection via other devices and connections.

Throughout this disclosure including in the claims, the following expressions have the following definitions:
  speaker and loudspeaker are used synonymously to denote any sound-emitting transducer. This definition includes loudspeakers implemented as multiple transducers (e.g., woofer and tweeter);
  speaker feed: an audio signal to be applied directly to a loudspeaker, or an audio signal that is to be applied to an amplifier and loudspeaker in series;
  channel (or "audio channel"): a monophonic audio signal. Such a signal can typically be rendered in such a way as to be equivalent to application of the signal directly to a loudspeaker at a desired or nominal position. The desired position can be static, as is typically the case with physical loudspeakers, or dynamic;
  audio program: a set of one or more audio channels (at least one speaker channel and/or at least one object channel) and optionally also associated metadata (e.g., metadata that describes a desired spatial audio presentation);

speaker channel (or "speaker-feed channel"): an audio channel that is associated with a named loudspeaker (at a desired or nominal position), or with a named speaker zone within a defined speaker configuration. A speaker channel is rendered in such a way as to be equivalent to application of the audio signal directly to the named loudspeaker (at the desired or nominal position) or to a speaker in the named speaker zone;

object channel: an audio channel indicative of sound emitted by an audio source (sometimes referred to as an audio "object"). Typically, an object channel determines a parametric audio source description (e.g., metadata indicative of the parametric audio source description is included in or provided with the object channel). The source description may determine sound emitted by the source (as a function of time), the apparent position (e.g., 3D spatial coordinates) of the source as a function of time, and optionally at least one additional parameter (e.g., apparent source size or width) characterizing the source;

object based audio program: an audio program comprising a set of one or more object channels (and optionally also comprising at least one speaker channel) and optionally also associated metadata (e.g., metadata indicative of a trajectory of an audio object which emits sound indicated by an object channel, or metadata otherwise indicative of a desired spatial audio presentation of sound indicated by an object channel, or metadata indicative of an identification of at least one audio object which is a source of sound indicated by an object channel); and render: the process of converting an audio program into one or more speaker feeds, or the process of converting an audio program into one or more speaker feeds and converting the speaker feed(s) to sound using one or more loudspeakers (in the latter case, the rendering is sometimes referred to herein as rendering "by" the loudspeaker(s)). An audio channel can be trivially rendered ("at" a desired position) by applying the signal directly to a physical loudspeaker at the desired position, or one or more audio channels can be rendered using one of a variety of virtualization techniques designed to be substantially equivalent (for the listener) to such trivial rendering. In this latter case, each audio channel may be converted to one or more speaker feeds to be applied to loudspeaker(s) in known locations, which are in general different from the desired position, such that sound emitted by the loudspeaker(s) in response to the feed(s) will be perceived as emitting from the desired position. Examples of such virtualization techniques include binaural rendering via headphones (e.g., using Dolby Headphone processing which simulates up to 7.1 channels of surround sound for the headphone wearer) and wave field synthesis.

DETAILED DESCRIPTION OF EMBODIMENTS OF THE INVENTION

FIG. 5 is a block diagram of an example of an audio processing chain (audio data processing system), in which one or more of the elements of the system may be configured in accordance with an embodiment of the present invention. The system includes the followings elements, coupled together as shown: capture unit 1, production unit 3 (which includes an encoding subsystem), delivery subsystem 5, decoder 7, object processing subsystem 9, controller 10, and rendering subsystem 11. In variations on the system shown, one or more of the elements are omitted, or additional audio data processing units are included. Typically, elements 7, 9, 10, and 11 are, or are included in, a playback system (e.g., the end user's home theater system).

Capture unit 1 is typically configured to generate PCM (time-domain) samples comprising audio content, and to output the PCM samples. The samples may be indicative of multiple streams of audio captured by microphones (e.g., at a sporting event or other spectator event). Production unit 3, typically operated by a broadcaster, is configured to accept the PCM samples as input and to output an object based audio program indicative of the audio content. The program typically is or includes an encoded (e.g., compressed) audio bitstream (sometimes referred to herein as a "main mix") indicative of at least some of the audio content, and optionally also at least one additional bitstream or file (sometimes referred to herein as a "side mix") indicative of some of the audio content. The data of the encoded bitstream (and of each generated side mix, if any is generated) that are indicative of the audio content are sometimes referred to herein as "audio data." If the encoding subsystem of production unit 3 is configured in accordance with a typical embodiment of the present invention, the object based audio program output from unit 3 is indicative of (i.e., includes) multiple speaker channels (a "bed" of speaker channels and optionally also replacement speaker channels) of audio data, multiple object channels of audio data, and object related metadata (including conditional rendering metadata). The program may include a main mix which in turn includes audio content indicative of a bed of speaker channels, replacement speaker channels, audio content indicative of at least one user-selectable object channel (and optionally at least one other object channel), and metadata (including object related metadata associated with each object channel, which in turn includes conditional rendering metadata for at least one object channel). The program may also include at least one side mix which includes audio content indicative of at least one other object channel (e.g., at least one user-selectable object channel) and/or object related metadata. The object related metadata of the program may include durable metadata (to be described below). The program (e.g., the main mix thereof) may be indicative of one or more sets of speaker channels. For example, the main mix may be indicative of two or more sets of speaker channels (e.g., a 5.1 channel neutral crowd noise bed, a 2.0 channel set of replacement speaker channels indicative of home team crowd noise, and a 2.0 channel set of replacement speaker channels indicative of away team crowd noise), including at least one user-selectable set of replacement speaker channels (which can be selected using the same user interface employed for user selection of object channel content or configuration) and a bed of speaker channels (which will be rendered in the absence of user selection of other content of the program). The bed (which may be referred to as a default bed) may be determined by data indicative of configuration (e.g., the initial configuration) of the speaker set of the playback system, and optionally the user may select other audio content of the program to be rendered in place of the default bed.

The metadata of the program may be indicative of at least one (and typically more than one) selectable predetermined mix of content of at least one of the object channels and content of predetermined ones of the speaker channels of the bed and/or replacement speaker channels of the program, and may include rendering parameters for each said mix.

Delivery subsystem 5 of FIG. 5 is configured to store and/or transmit (e.g., broadcast) the program generated by unit 3 (e.g., main mix and each side mix thereof, if any side mix is generated).

In some embodiments, subsystem 5 implements delivery of an object based audio program, in which audio objects (and at least some corresponding object related metadata) and speaker channels of the program are sent over a broadcast system (in a main mix of the program, indicated by an audio bitstream which is broadcast), and at least some metadata of the program (e.g., object related metadata indicative of constraints on rendering or mixing of object channels of the program) and/or at least one object channel of the program, are delivered (as a "side mix" of the main mix) in another manner (e.g., the side mix is sent to a specific end user by an Internet Protocol or "IP" network). Alternatively, the end user's decoding and/or rendering system is preconfigured with at least some object related metadata (e.g., metadata indicative of constraints on rendering or mixing of audio objects of an embodiment of the inventive object based audio program), and such object related metadata is not broadcast or otherwise delivered (by subsystem 5) with the corresponding object channels (either in a main mix or side mix of the object based audio program).

In some embodiments, timing and synchronization of portions or elements of an object based audio program which are delivered over separate paths (e.g., a main mix which is broadcast over a broadcast system, and related metadata which are sent as a side mix over an IP network), is provided by synchronization words (e.g., time codes) that are sent over all the delivery paths (e.g., in a main mix and each corresponding side mix).

With reference again to FIG. 5, decoder 7 accepts (receives or reads) the program (or at least one bitstream or other element of the program) delivered by delivery subsystem 5, and decodes the program (or each accepted element thereof). In some embodiments of the invention, the program includes a main mix (an encoded bitstream, e.g., an AC-3 or E-AC-3 encoded bitstream) and at least one side mix of the main mix, and decoder 7 receives and decodes the main mix (and optionally also at least one side mix). Optionally, at least one side mix of the program (e.g., an object channel) which does not need to be decoded is delivered by subsystem 5 directly to object processing subsystem 9. If decoder 7 is configured in accordance with a typical embodiment of the present invention, the output of decoder 7 in typical operation includes the following:

streams of audio samples indicative of the program's bed of speaker channels (and typically also of replacement speaker channels of the program); and streams of audio samples indicative of object channels (e.g., user-selectable audio object channels) of the program and corresponding streams of object related metadata (including conditional rendering metadata).

Object processing subsystem 9 is coupled to receive (from decoder 7) decoded speaker channels, object channels, and object related metadata (including conditional rendering metadata) of the delivered program, and optionally also at least one side mix (indicative of at least one other object channel) of the program. For example, subsystem 9 may receive (from decoder 7) audio samples of the program's speaker channels and of at least one object channel of the program, and object related metadata of the program, and may also receive (from delivery subsystem 5) audio samples of at least one other object channel of the program (which have not undergone decoding in decoder 7).

Subsystem 9 is coupled and configured to output to rendering subsystem 11 a selected subset of the full set of object channels indicated by the program, and corresponding object related metadata. The selected subset of object channels may be determined at least in part by conditional rendering metadata of the program. Subsystem 9 is typically also configured to pass through unchanged (to subsystem 11) the decoded speaker channels from decoder 7, and may be configured to process at least some of the object channels (and/or metadata) asserted thereto to generate the object channels and metadata it asserts to subsystem 11.

The object channel selection performed by subsystem 9 is typically determined by user selection(s) (as indicated by control data asserted to subsystem 9 from controller 10) and/or rules (e.g., indicative of conditions and/or downmix constraints or other rendering constraints determined by conditional rendering metadata of the program) which subsystem 9 has been programmed or otherwise configured (e.g., in response to conditional rendering metadata) to implement. Such rules may be determined by conditional rendering metadata and/or other object related metadata of the program and/or by other data (e.g., data indicative of the capabilities and configuration of the playback system's speaker array) asserted to subsystem 9 (e.g., from controller 10 or another external source) and/or by preconfiguring (e.g., programming) subsystem 9. In some embodiments, controller 10 (via a user interface implemented by controller 10) provides (e.g., displays on a touch screen) to the user a menu or palette of selectable "preset" mixes of speaker channel content (i.e., content of bed speaker channels and/or replacement speaker channels) and object channel content (objects). The selectable preset mixes may be determined by object related metadata of the program and typically also by rules implemented by subsystem 9 (e.g., rules determined by conditional rendering metadata of the program, and/or rules which subsystem 9 has been preconfigured to implement). The user selects from among the selectable mixes by entering commands to controller 10 (e.g., by actuating a touch screen thereof), and in response, controller 10 asserts corresponding control data to subsystem 9 to cause rendering of the corresponding content in accordance with the invention.

Rendering subsystem 11 of FIG. 5 is configured to render the audio content determined by the output of subsystem 9, for playback by playback speaker array 13 of the playback system. Subsystem 11 has knowledge of (e.g., is provided with data indicative of) the playback speaker array configuration of array 13 (e.g., the number of speakers of array 13, the type (e.g., full range or subwoofer) of each speaker of array 13, and the nominal or assumed location (e.g., in or above the plane of the floor, or the plane of the assumed position of a listener's ears) of each speaker of array 13 in the playback environment). Subsystem 11 is configured to map, to the available speaker channels, the audio object(s) determined by the object channel(s) selected by object processing subsystem 9 (e.g., default objects, and/or user-selected objects which have been selected as a result of user interaction using controller 10), using rendering parameters output from subsystem 9 (e.g., user-selected and/or default values of spatial position and level) which are associated with each selected object. At least some of the rendering parameters are determined by the object related metadata output from subsystem 9. Rendering system 11 also receives the speaker channels passed through by subsystem 9. Typically, subsystem 11 is an intelligent mixer, and is configured to determine speaker feeds for the available speakers of array 13 including by mapping one or more selected (e.g., default-selected) objects to each of a number of individual speaker channels, and mixing the objects with speaker channel content indicated by each corresponding speaker channel of the program (e.g., each speaker channel of the program's bed of speaker channels). Typically, subsystem 11 is configured to render a downmix (consisting of a set of N downmixed speaker channels, where N is a positive integer) of audio channels (e.g., speaker channels and at least one object channel) asserted thereto from subsystem 9, generating N speaker feeds from the downmixed speaker channels, and causing N speakers of playback speaker array 13 to emit sound by driving the speakers with the speaker feeds, where the downmix is compliant with at least one (e.g., each) downmixing constraint indicated by conditional rendering metadata of the program whose content is rendered.

An object based audio program generated in accordance with typical embodiments of the invention (e.g., by unit 3 of FIG. 5) may be rendered (e.g., by the playback subsystem of FIG. 5, or the FIG. 6 system) to cause sound indicative of downmixed content (e.g., of object channels and/or speaker channels) of the program played by a playback speaker array to be perceived as emitting from different apparent source locations within the sound reproduction (playback) environment. For an interactive presentation, objects determined by selected ones of selectable object channels are rendered at locations (e.g., a set of different static locations, corresponding to different ones of a set of selected objects) within the rendered soundfield, such that audio content of each selected object channel is rendered so as to be perceived as emitting from an apparent source location (or trajectory of locations) determined by object related metadata corresponding to the selected object channel. For example, an immersive sound mix determined from an object based audio program may indicate sound which is in turn indicative of a "public address" audio object (determined by a selected object channel of the program) so as to be perceived as emitting from an apparent source location above the assumed listener's position within the reproduction environment to give the listener (consumer) the experience of being in a stadium while announcements are emitted from a public address loudspeaker mounted above the listener. Such a public address audio object may be selected for rendering and playback by a speaker array comprising at least one above-floor speaker physically located in a horizontal plane (sometimes referred to as an "above-floor" or "height" plane) above a "floor" plane, where the "floor" plane is a horizontal plane which nominally includes the expected positions of the listener's ears. Typically, other speakers of the playback speaker array are nominally located in the floor plane.

When an audio object (e.g., the public address audio object of the previous example) is determined by a discrete object channel of an object based audio program, and corresponding metadata of the program indicates an above-floor source location (or trajectory of above-floor source locations) from which the corresponding sound should be perceived as emitting when the object channel is selected (and rendered and played), we refer to the audio object as an "above-floor" (or "height") object, and to the object channel which indicates the above-floor object as an "above-floor" (or "height") object channel. An above-floor audio object is typically rendered and played so that the resulting sound is emitted from at least one above-floor (or "height") speaker of the playback system speaker array.

If no above-floor ("height") speaker is present in the playback system speaker array, a traditional downmixing technique (of the type mentioned above) may be employed to downmix content of a selected "above-floor" object channel with content of speaker channels of the program (where the speaker channel content is intended to be played by floor speakers of the playback speaker array), so that the resulting downmixed sound is emitted only from floor speakers of the playback speaker array. However, because the content of the above-floor object channel would be downmixed into the content of the speaker channels, the downmixing would undesirably result in a cacophonous-sounding mix (e.g., in which the above-floor content would be perceived as interfering with original speaker channel content).

In a class of embodiments, an object based audio program (e.g., an object based program generated by unit 3 of FIG. 3) includes conditional rendering metadata corresponding to at least one object channel (e.g., an above-floor object channel) of the program. Thus, each audio object indicated by each such object channel has corresponding conditional rendering metadata. For example, in some embodiments an audio object having corresponding conditional rendering metadata may be an above-floor object. The conditional rendering metadata is object related metadata indicative of at least one rendering constraint (e.g., at least one downmixing constraint), based on playback speaker array configuration, which applies to each corresponding object channel (i.e., each object channel corresponding to the conditional rendering metadata). An example of such a downmixing constraint is a prohibition against downmixing of a corresponding object channel when the playback speaker array configuration is of a specific type. A playback system (having knowledge that its playback speaker array is of this specific type) may be configured (e.g., preconfigured, or configured in response to metadata of the program) to operate in response to the conditional rendering metadata by preventing implementation of any downmix of the object channel into a speaker channel of the program. Another example of such a downmixing constraint is an indication of at least one permissible downmix (or type of downmix) including a corresponding object channel when the playback speaker array configuration is of a specific type.

In a third example, the conditional rendering metadata may indicate that a corresponding object channel is of a first type (e.g., the object channel is indicative of an above-floor object) and that when the playback speaker array configuration is of a second type (e.g., when the array includes no above-floor speaker) no object channel of the program which is of the first type may be downmixed into a speaker channel intended for driving any speaker of the playback speaker array. Assuming that the program includes conditional rendering metadata of this type, a playback system (e.g., the system of FIG. 6 or the playback subsystem of FIG. 5) having knowledge that its playback speaker array is of the second type may be configured (e.g., preconfigured, or configured in response to metadata of the program) to operate in response to the conditional rendering metadata by recognizing that the object channel is of the first type and preventing implementation of any downmix of the object channel into a speaker channel (specified by a user-selected mix of content of the program) intended for driving any speaker of the playback speaker array. In this case, the playback system may be configured also to notify the user (e.g., by displaying the notification on a display screen of controller 10 of FIG. 5 or controller 23 of FIG. 6) that the selected mix is unavailable. Also assuming that the program includes conditional rendering metadata of this type, a playback system (having knowledge that its playback speaker array is not of the second type) may be configured to operate in response to the conditional rendering metadata by recognizing that the object channel is of the first type and implementing a downmix of the object channel into a speaker channel (specified by a user-selected mix, or default mix, of content of the program) intended for driving a speaker of the playback speaker array.

Optionally, the conditional rendering metadata included in an object based audio program is also indicative of at least one rendering rule (e.g., at least one downmix rule), based on playback speaker array configuration, for rendering (e.g., implementing a downmix of) audio channels of the program. For example, the conditional rendering metadata may indicate the following downmix rules:

each object channel of the program of a first type (e.g., as indicated by at least some conditional rendering metadata of the program) should be downmixed into any speaker channel specified by any user-selected (or default) mix of content of the program if the playback speaker array includes at least one above-floor speaker, each object channel of the program of the first type should be ignored (i.e., should not be included in any downmix) by the playback system if the playback speaker array does not include at least one above-floor speaker, and each object channel of the program of a second type (e.g., as indicated by at least some conditional rendering metadata of the program) should be downmixed into any speaker channel specified by any user-selected (or default) mix of content of channels of the program regardless of configuration of the playback speaker array.

In a class of embodiments, the invention is a method for generating an object based audio program for playback by a speaker array (e.g., playback speaker array 13 of FIG. 5), said method including steps of:

generating (e.g., in unit 3 of FIG. 5) conditional rendering metadata corresponding to at least one object channel, such that the conditional rendering metadata is indicative of at least one rendering constraint (e.g., at least one downmixing constraint), based on playback speaker array configuration (e.g., configuration of playback speaker array 13), which applies to said at least one object channel;

determining (e.g., in unit 3 of FIG. 5) a set of audio channels including said at least one object channel (and optionally also at least one speaker channel); and generating (e.g., in unit 3 of FIG. 5) the object based audio program such that said object based audio program is indicative of the set of audio channels and the conditional rendering metadata, and such that content of at least one audio channel of the set of audio channels is renderable, in a manner compliant with the at least one rendering constraint, by a playback system in response to at least some of the conditional rendering metadata.

An example of a downmixing constraint indicated by the conditional rendering metadata is a prohibition against downmixing of a corresponding object channel when the playback speaker array configuration is of a specific type. Another example of a rendering constraint (which is a downmixing constraint) indicated by the conditional rendering metadata is an indication of at least one permissible downmix (or type of downmix) including a corresponding object channel when the playback speaker array configuration is of a specific type. Optionally, the conditional rendering metadata is also indicative of at least one downmix rule, based on playback speaker array configuration, for implementing a downmix of audio channels of the program.

Figure 6:
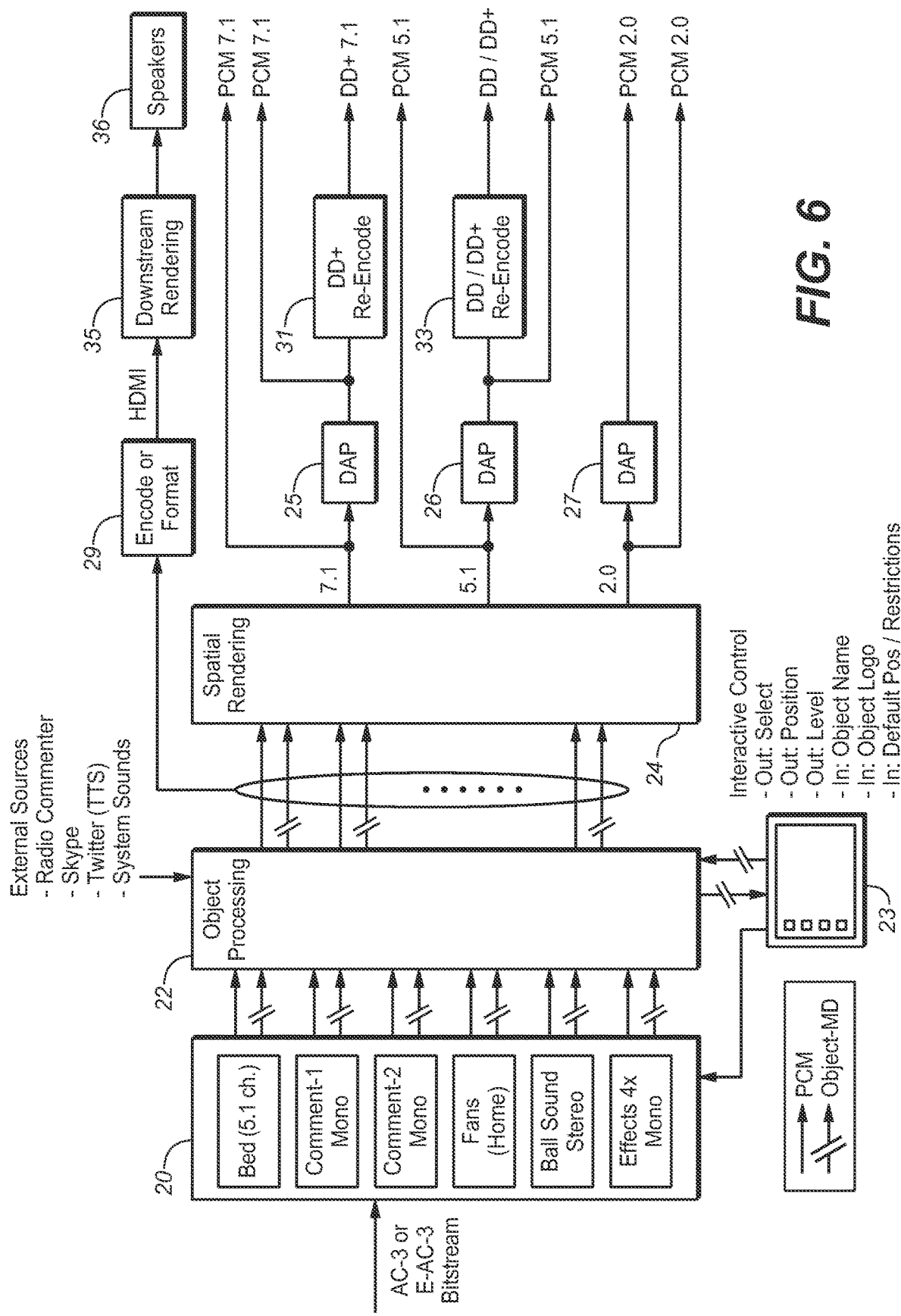
FIG. 6 is a block diagram of a playback system which may be implemented to perform an embodiment of the inventive method.

In other embodiments, the invention is a method of rendering audio content determined by an object based audio program, wherein the program is indicative of conditional rendering metadata corresponding to at least one object channel, and a set of audio channels including the at least one object channel (and optionally also at least one speaker channel), and wherein the conditional rendering metadata is indicative of at least one rendering constraint (e.g., at least one downmixing constraint), based on playback speaker array configuration, which applies to said at least one object channel, said method including steps of:

(a) providing the object based audio program to an audio processing unit (e.g., an audio processing unit which implements the playback subsystem of FIG. 5, which comprises decoder 7, object processing subsystem 9, controller 10, and rendering subsystem 11, or an audio processing unit which implements the FIG. 6 playback system); and (b) in the audio processing unit (e.g., in decoder 7 of FIG. 5 or decoder 20 of FIG. 6), parsing the conditional rendering metadata and the set of audio channels, and rendering (e.g., in subsystems 9 and 11 of FIG. 5 or subsystem 24 of FIG. 6) content of at least one audio channel of the set of audio channels, in a manner compliant with the at least one rendering constraint, in response to at least some of the conditional rendering metadata.

In some such embodiments, step (b) includes a step of selecting at least one object channel of the set of audio channels (e.g., in subsystem 22 of FIG. 6), and mixing (e.g., in subsystem 24 of FIG. 6) each selected object channel of the set with at least one speaker channel of the set to generate the downmix. Typically, the downmix consists of a set of N downmixed speaker channels, where N is a positive integer, and step (b) includes a step of causing N speakers of a playback speaker array to emit sound by driving the speakers with speaker feeds generated from the downmixed speaker channels.

An example of a downmixing constraint indicated by the conditional rendering metadata is a prohibition against downmixing of a corresponding object channel when the playback speaker array configuration is of a specific type. Another example of a downmixing constraint indicated by the conditional rendering metadata is an indication of at least one permissible downmix (or type of downmix) including a corresponding object channel when the playback speaker array configuration is of a specific type. Optionally, the conditional rendering metadata is also indicative of at least one rendering rule (e.g., at least one downmix rule), based on playback speaker array configuration, and the rendering performed in step (b) is compliant with the rendering rule.

Table 1 below sets forth examples of audio object placement in downmixes based on playback speaker array configuration, and enablement of types of downmixing based on playback speaker array configuration, which may be indicated by conditional rendering metadata in an object based audio program. In Table 1, the columns represent different audio object channels of (and thus audio objects indicated by) the program and the rows indicate different playback speaker array configurations of a playback system which performs the downmixing:

TABLE 1

|  | Ambience | Main Comm. | Home Comm. | Away Comm. | P.A. |
|---|---|---|---|---|---|
| Stereo | L/R | L/R | | | |
| 5.1 | 5.1 | | Ls/Rs | | |
| 5.1 + 4 height | 5.1 + Height | | Ls/Rs | | Height |

In the Table 1 example, the program is indicative of audio captured at a sporting event in which two teams compete, and includes at least the following object channels (as indicated in Table 1): an ambience channel (indicative of ambient content captured at the event); a main commentary channel ("Main Comm.") indicative of commentary which is not biased in favor of either team; a second commentary channel ("Home Comm.") indicative of commentary biased in favor of the home team; a third commentary channel ("Away Comm.") indicative of commentary biased in favor of the away team; and a public announcement channel ("P.A.") indicative of public address audio. The public address content of the public announcement channel is intended to be rendered by an above-floor speaker of a playback speaker array (so that the resulting emitted sound is perceived as emitting from an apparent source location above the assumed listener's position). Each of the main commentary, second commentary, and third commentary channels is intended to be rendered by left surround and right surround floor speakers of a playback speaker array (so that each apparent source location from which the emitted sound is perceived to emit is nominally in the plane of the listener's ears). The ambience channel is intended to be rendered by all speakers (i.e., all available floor speakers and above-floor speakers) of a playback speaker array.

In the example, the conditional rendering metadata indicates that when the playback speaker array is a stereo speaker array (consisting only of a left ("L") floor speaker and a right ("R") floor speaker), the ambience object channel and/or the main commentary object channel may be downmixed with other audio content of the program (but not content of the public announcement channel) to generate left and right downmix channels for driving the stereo speakers. The conditional rendering metadata also indicates that when the playback speaker array is a stereo speaker array, the public announcement object channel should not be downmixed with other audio content of the program (i.e., the conditional rendering metadata establishes a rule preventing downmixing of content of the public announcement object channel).

In the example, the conditional rendering metadata also indicates that when the playback speaker array is a 5.1 speaker array (whose full frequency range speakers are left ("L"), center ("C"), right ("R"), left surround ("Ls"), and right surround ("Rs") floor speakers), the main commentary object channel may be downmixed with other audio content of the program (but not content of the public announcement channel) to generate left surround and right surround downmix channels for driving the Ls and Rs floor speakers of the array. The conditional rendering metadata also indicates that when the playback speaker array is a 5.1 speaker array, the ambience object channel may be downmixed with other audio content of the program (but not content of the public announcement channel) to generate left, right, center, left surround, and right surround downmix channels for driving the L, R, C, Ls, and Rs floor speakers of the array. The conditional rendering metadata also indicates that when the playback speaker array is a 5.1 speaker array, the public announcement object channel should not be downmixed with other audio content of the program (i.e., the conditional rendering metadata establishes a rule preventing downmixing of content of the public announcement object channel).

In the example, the conditional rendering metadata also indicates that when the playback speaker array is a 5.1.4 speaker array (whose full frequency range speakers are left ("L"), center ("C"), right ("R"), left surround ("Ls"), and right surround ("Rs") floor speakers, and four "height" speakers), the main commentary object channel may be downmixed with other audio content of the program (but not content of the public announcement channel) to generate left surround and right surround downmix channels for driving the left surround and right surround floor speakers. The conditional rendering metadata also indicates that when the playback speaker array is a 5.1.4 speaker array, the ambience object channel may be downmixed with other audio content of the program (but not content of the public announcement channel) to generate left, right, center, left surround, right surround, and four height downmix channels for driving the L, R, C, Ls, and Rs floor speakers and the four height speakers of the array. The conditional rendering metadata also indicates that when the playback speaker array is a 5.1.4 speaker array, the public announcement object channel should not be downmixed with other audio content of the program into floor speaker downmix channels (i.e., the conditional rendering metadata establishes a rule preventing downmixing of content of the public announcement object channel into floor channels of a downmix). The conditional rendering metadata does not establish any rule preventing the public announcement object channel from being downmixed with other audio content of the program (e.g., content of another height object channel) to generate height downmix channels for driving height speakers of a playback speaker array.

In accordance with typical embodiments of the invention, conditional rendering of object channel content of an object based audio program in response to conditional rendering metadata included in the program (assuming knowledge of the available playback speaker array configuration) allows user selection from among a menu of rendering options (e.g., downmix rendering options) available given a specific playback speaker array configuration. For example, the menu may include a small number of selectable downmix rendering options given that the playback speaker array consists only of floor speakers in a 5.1 channel configuration, including the following options: a "home team commentary" downmix including content of a bed of speaker channels downmixed with a "home team commentary" object, an "away team commentary" downmix including content of a bed of speaker channels downmixed with an "away team commentary" object, and a "home team commentary plus home team crowd noise" downmix including content of a bed of speaker channels downmixed with a "home team commentary" object and a "home team crowd noise" object.

For another example, the menu may include a larger number of selectable downmix rendering options given that the playback speaker array consists of floor speakers (e.g., in a 5.1 channel configuration) and a set of height (above-floor) speakers, including the following options: a "home team commentary" floor downmix including content of a bed of speaker channels downmixed with a "home team commentary" object (for driving only floor speakers of the array), an "away team commentary" floor downmix including content of a bed of speaker channels downmixed with an "away team commentary" object (for driving only floor speakers of the array), a "home team commentary plus home team crowd noise" floor downmix including content of a bed of speaker channels downmixed with a "home team commentary" object and a "home team crowd noise" object (for driving only floor speakers of the array), and a "home team commentary plus home team crowd noise plus public announcement" downmix including content of a bed of speaker channels downmixed with a "home team commentary" object, a "home team crowd noise" object, and a public announcement object (for driving all speakers of the array, but with content of the public announcement object channel included only in downmix speaker feeds which drive above-floor speakers of the array, and all other content of the downmix included only in downmix speaker feeds which drive floor speakers of the array).

The menu of rendering options may be presented to the user by a user interface of a controller (e.g., a user interface implemented by controller 10 of FIG. 5 or controller 23 of FIG. 6), and the controller may be coupled to a set top device (or other device) configured to decode and render (at least partially) the object based program. Metadata (including conditional rendering metadata) included in the program may allow user selection from among a set of options as to which object(s) indicated by the program should be rendered, and as to how the object(s) to be rendered should be downmixed with other content of the program so that the resulting channels of downmixed content can be rendered.

In some embodiments, the conditional rendering metadata specifies at least the following attributes of each selectable downmix (of audio content of the program) selectable by a user (e.g., each selectable downmix indicated by a menu of downmix rendering options), given the availability of a playback speaker array having a specific corresponding configuration (of a set of possible playback speaker array configurations):

presence (i.e., for each object channel, an indication as to whether the object channel should be present in the downmix for rendering by a playback speaker array having the corresponding configuration);

position within soundfield (i.e., for each object channel to be included in a downmix for rendering by a playback speaker array having the corresponding configuration, an indication of apparent spatial location from which the corresponding sound should be perceived as emitting when speaker feeds determined by the downmix drive the available speakers);

gain (i.e., for each object channel to be included in a downmix for rendering by a playback speaker array having the corresponding configuration, an indication of the gain to be applied to the corresponding audio samples when generating the downmix); and effects (i.e., for each object channel to be included in a downmix for rendering by a playback speaker array having the corresponding configuration, an indication each type of special effects processing (if any) to be applied to the corresponding audio samples when generating the downmix. Examples of such processing include but are not limited to divergence processing and reverb application).

Aspects of embodiments of the invention include the following:

methods and systems for generating conditional rendering metadata (e.g., in an authoring system or content creation facility) and including the metadata in an object based audio program (for example, some embodiments of the inventive program generation system (e.g., unit 3 of FIG. 5) are programmed or otherwise configured to execute authoring software or to otherwise use authoring tools to define and generate conditional rendering metadata for inclusion in an object based audio program); and methods and systems (e.g., decoders and playback systems) for decoding an object based audio program (including by parsing conditional rendering metadata of the program) and/or rendering content of an object based audio program (including by parsing conditional rendering metadata and performing downmixing of program content in accordance with the conditional rendering metadata).

In some embodiments, object related metadata (including conditional rendering metadata) of an object based audio program includes (or consists of) selectable content metadata indicative of a set of selectable experience definitions. Each experience definition is a selectable, predetermined ("preset") mix of audio content of the program (e.g., a mix of content of at least one object channel and at least one speaker channel). Each preset mix has a predetermined set of rendering parameters (e.g., spatial locations of rendered objects). The preset mixes may be presented by a user interface of a playback system (e.g., a user interface implemented by controller 10 of FIG. 5 or controller 23 of FIG. 6) as a limited menu or palette of available mixes. Optionally, object related metadata (including conditional rendering metadata) of the program includes metadata indicative of a layered mix graph indicative of selectable mixes (e.g., all selectable mixes) of speaker channels and object channel(s) of the program.

FIG. 6 is a block diagram of an embodiment of a playback system which includes decoder 20, object processing subsystem 22, spatial rendering subsystem 25, controller 23 (which implements a user interface), and optionally also digital audio processing subsystems 25, 26, and 27, coupled as shown, and which can be implemented to perform embodiments of the inventive method. In some implementations, elements 20, 22, 24, 25, 26, 27, 29, 31, and 33 of the FIG. 6 system are implemented as a set top device.

In the system of FIG. 6, decoder 20 is configured to receive and decode an encoded signal indicative of object based audio program (or of a main mix of object based audio program). Typically, the program (e.g., the program's main mix) is indicative of audio content including a bed of at least two speaker channels, at least one user-selectable object channel, and object related metadata (including conditional rendering metadata) corresponding to each object channel, in accordance with an embodiment of the invention. Each object channel is indicative of an audio object, and thus object channels are sometimes referred to herein as "objects" for convenience. In an embodiment, the program is (or includes main mix which is) an AC-3 or E-AC-3 bitstream, indicative of audio objects, object-related metadata (including conditional rendering metadata), a bed of speaker channels, and optionally also selectable replacement speaker channels. Typically, the individual audio objects are either mono or stereo coded (i.e., each object channel is indicative of a left or right channel of an object, or is a monophonic channel indicative of an object), the bed is a traditional 5.1 mix, and decoder 20 may be configured to decode up to 16 channels of audio content (including the six speaker channels of the bed, and replacement speaker channels and object channels) simultaneously.

In some embodiments of the inventive playback system, each frame of an incoming E-AC-3 (or AC-3) encoded bitstream includes one or two metadata "containers." The incoming bitstream is indicative of an object based audio program, or a main mix of such a program, and the speaker channels of the program are organized as is the audio content of a conventional E-AC-3 (or AC-3) bitstream. One container can be included in the Aux field of the frame, and another container can be included in the addbsi field of the frame. Each container has a core header and includes (or is associated with) one or more payloads. One such payload (of or associated with a container included in the Aux field) may be a set of audio samples of each of one or more of the object channels (related to a bed of speaker channels which is also indicated by the program) and object related metadata (including conditional rendering metadata) associated with each object channel. In such a payload, the samples of some or all of the object channels (and associated metadata) may be organized as standard E-AC-3 (or AC-3) frames, or may be otherwise organized (e.g., they may be included in a side mix distinct from an E-AC-3 or AC-3 bitstream). An example of another such payload (of or associated with a container included in either the addbsi field or the Aux field) is a set of loudness processing state metadata associated with the audio content of the frame.

In some such embodiments, the decoder (e.g., decoder 20 of FIG. 6) would parse the core header of the container in the Aux field, and extract the inventive object channels and associated metadata from the container (e.g., from the Aux field of the AC-3 or E-AC-3 frame) and/or from the location (e.g., side mix) indicated by the core header. After extracting the payload (object channels and associated metadata), the decoder would perform any necessary decoding on the extracted payload.

The core header of each container typically includes: at least one ID value indicating the type of payload(s) included in or associated with the container; substream association indications (indicating which substreams the core header is associated with); and protection bits. Such protection bits (which may consist of or include a hash-based message authentication code or "HMAC") would typically be useful for at least one of decryption, authentication, or validation of object related metadata (including conditional rendering metadata) and/or loudness processing state metadata (and optionally also other metadata) included in at least one payload included or associated with the container, and/or corresponding audio data included in the frame. Substreams may be located "in band" (in the E-AC-3 or AC-3 bitstream) or "out of band" (e.g., in a side mix bitstream separate from the E-AC-3 or AC-3 bitstream). One type of such payload is a set of audio samples of each of one or more object channels (related to the bed of speaker channels which is also indicated by the program) and the object related metadata associated with each object channel. Each object channel is a separate substream, and would typically be identified in the core header. Another type of payload is loudness processing state metadata.

Typically, each payload has its own header (or "payload identifier"). Object level metadata may be carried in each substream which is an object channel. Program level metadata may be included in the core header of the container and/or in the header for a payload which is a set of audio samples of one or more object channels (and the metadata associated with each object channel).

In some embodiments, each of the containers in the auxdata (or addbsi) field of the frame has three levels of structure:
a high level structure, including a flag indicating whether the auxdata (or addbsi) field includes metadata (where "metadata" in this context denotes object channels, object related metadata, and any other audio content or metadata which is carried by the bitstream but is not conventionally carried in a conventional E-AC-3 or AC-3 bitstream which lacks any container of the type being described), at least one ID value indicating what type(s) of metadata are present, and typically also a value indicating how many bits of metadata (e.g., of each type) are present (if metadata is present). In this context, an example of one such "type" of metadata is object channel data and associated object related metadata (i.e., a set of audio samples of each of one or more object channels (related to the bed of speaker channels also indicated by the program) and the metadata associated with each object channel);
an intermediate level structure, comprising a core element for each identified type of metadata (e.g., core header, protection values, and payload ID and payload size values, e.g., of the type mentioned above, for each identified type of metadata); and
a low level structure, comprising each payload for one core element if at least one such payload is identified by the core element as being present. An example of such a payload is a set of audio samples of each of one or more object channels (related to the bed of speaker channels which is also indicated by the program) and metadata associated with each object channel. Another example of such a payload is a payload comprising loudness processing state metadata ("LPSM"), sometimes referred to as an LPSM payload.

The data values in such a three level structure can be nested. For example, the protection value(s) for a payload (e.g., an LPSM payload) identified by a core element can be included after each payload identified by the core element (and thus after the core header of the core element). In one example, a core header could identify a first payload (e.g., an LPSM payload) and another payload, payload ID and payload size values for the first payload could follow the core header, the first payload itself could follow the ID and size values, the payload ID and payload size value for the second payload could follow the first payload, the second payload itself could follow these ID and size values, and protection value(s) for either or both of the payloads (or for core element values and either or both of the payloads) could follow the last payload.

With reference again to FIG. 6, a user employs controller 23 to select objects (indicated by the object based audio program) to be rendered. Controller 23 may be a handheld processing device (e.g., an iPad) which is programmed to implement a user interface (e.g., an iPad App) compatible with the other elements of the FIG. 6 system. The user interface may provide (e.g., display on a touch screen) to the user a menu or palette of selectable "preset" mixes of objects, "bed" speaker channel content, and replacement speaker channel content. The selectable preset mixes may be determined by object related metadata (including conditional rendering metadata) of the program and typically also by rules implemented by subsystem 22 (e.g., rules which subsystem 22 has been preconfigured to implement) assuming knowledge by subsystem 22 of the configuration of the available playback speaker array. The user would select from among the selectable mixes by entering commands to controller 23 (e.g., by actuating a touch screen thereof), and in response, controller 23 would assert corresponding control data to subsystem 22.

In operation, decoder 20 decodes the speaker channels of the program's bed of speaker channels (and any replacement speaker channels included in the program), and outputs to subsystem 22 decoded speaker channels. In response to the object based audio program, and in response to control data from controller 23 indicative of a selected subset of the program's full set of object channels to be rendered (including by undergoing downmixing), decoder 20 decodes (if necessary) the selected object channels, and outputs to subsystem 22 the selected (e.g., decoded) object channels (each of which may be a pulse code modulated or "PCM" bitstream), and object related metadata corresponding to the selected object channels.

As well as the decoded speaker channels, decoded object channels, and decoded object-related metadata from decoder 20, the inputs to object processing subsystem 22 optionally include external audio object channels asserted (e.g., as one or more side mixes of a program whose main mix is asserted to decoder 20) to the system. Examples of objects indicated by such external audio object channels include a local commenter (e.g., monophonic audio content delivered by a radio channel), an incoming Skype call, an incoming twitter connection (converted via a text-to-speech system, not shown in FIG. 6), and system sounds.

Subsystem 22 is configured to output a selected subset of the full set of object channels indicated by the program (or processed versions of a selected subset of the full set of object channels) and corresponding object related metadata of the program, and a set of selected ones of the bed speaker channels and/or the replacement speaker channels. The object channel selection and speaker channel selection may be determined by user selections (as indicated by control data asserted to subsystem 22 from controller 23) and/or rules (e.g., indicative of conditions and/or constraints) which subsystem 22 has been programmed or otherwise configured to implement. Such rules may be determined by object related metadata (including conditional rendering metadata) of the program and/or by other data (including data indicative of the configuration (e.g., capabilities and organization) of the playback system's speaker array) asserted to subsystem 22 (e.g., from controller 23 or another external source) and/or by preconfiguring (e.g., programming) subsystem 22. In some embodiments, object related metadata (including conditional rendering metadata) of the program determines a set of selectable "preset" mixes of speaker channel content (of a bed of speaker channels and/or replacement speaker channels) and objects, and subsystem 22 uses this metadata to select the object channel(s) which it optionally processes and then asserts to subsystem 24 and the speaker channels which it asserts to subsystem 24. Subsystem 22 typically passes through unchanged (to subsystem 24) a selected subset of the decoded speaker channels (bed speaker channels and typically also replacement speaker channels) from decoder 20 (e.g., at least one speaker channel of a bed and at least one replacement speaker channel), and processes selected ones of the object channels asserted thereto.

The object processing (including object selection) performed by subsystem 22 is typically controlled by control data from controller 23 and object related metadata from decoder 20 (and optionally also object related metadata of side mixes asserted to subsystem 22 other than from decoder 20), and typically includes determination of a spatial position and a level for each selected object (regardless of whether the object selection is due to user selection or selection by rule application). Typically, default spatial positions and default levels for rendering objects, and restrictions on user selection of objects and their levels (in downmixed channels to be generated in subsystem 24) and spatial positions (indicated by such downmixed channels), are included in or indicated by object related metadata (including conditional rendering metadata) asserted (e.g., from decoder 20) to subsystem 22. Such restrictions may indicate forbidden combinations of objects (in a downmix) or forbidden spatial positions (indicated by downmixed channels) with which selected objects may be rendered (e.g., to prevent selected objects from being rendered too closely to each other, or to prevent specific objects from being included in downmixed channels for generating speaker feeds for driving the available playback speaker array). In addition, the loudness of individual selected objects is typically controlled by object processing subsystem 22 in response to control data entered using controller 23, and/or default levels indicated by object related metadata (e.g., from decoder 20), and/or by preconfiguration of subsystem 22.

Typically, the decoding performed by decoder 20 includes extraction (from the input program) of metadata indicating the type of audio content of each object indicated by the program (e.g., the type of sporting event indicated by the program's audio content, and names or other identifying indicia (e.g., team logos) of selectable and default objects indicated by the program). Controller 23 and object processing subsystem 22 receive this metadata or relevant information indicated by the metadata. Controller 23 also receives (e.g., is programmed with) information regarding the configuration of the user's playback speaker array (e.g., the number of speakers, and an assumed placement or other assumed organization of the speakers).

Spatial rendering subsystem 24 of FIG. 6 (or subsystem 24 with at least one downstream device or system) is configured to render the audio content output from subsystem 22 for playback by speakers of the user's playback speaker array. One or more of optionally included digital audio processing subsystems 25, 26, and 27 may implement post-processing on the output of subsystem 24.

Spatial rendering subsystem 24 is configured to downmix, to the available speaker channels, speaker channel content (e.g., a selected set of bed speaker channels and replacement speaker channels determined by subsystem 22 and passed through subsystem 22 to subsystem 24) and content of each audio object channel selected (or selected and processed) by object processing subsystem 22 and asserted to subsystem 24 (e.g., default-selected objects, and/or user-selected objects which have been selected as a result of user interaction using controller 23). The downmixing is accomplished using rendering parameters output from subsystem 22 (e.g., user-selected and/or default values of spatial position and level) which are associated with each selected object. Typically, subsystem 24 is an intelligent mixer, and is configured to determine speaker feeds for the available speakers including by mapping content of one, two, or more than two selected object channels to each of a number of individual speaker channels, and performing downmixing which mixes the selected object channel(s) with audio content indicated by each corresponding speaker channel.

In some implementations, the number of output (downmixed) speaker channels may vary between 2.0 and 7.1, and the speakers to be driven to render the selected audio object channels (in a downmix with the selected speaker channel content) may be assumed to be located in a (nominally) horizontal plane in the playback environment. In such cases, the rendering is performed so that the speakers can be driven to emit sound that will be perceived as emitting from distinct object locations in the plane of the speakers (i.e., one object location, or one sequence of object locations along a trajectory, for each selected or default object), mixed with sound determined by speaker channel content.

In various embodiments, the number of full range speakers to be driven to render the downmixed audio can be any number in a wide range (it is not necessarily limited to be in the range from 2 to 7), and thus the number of output speaker channels is not limited to be in the range from 2.0 and 7.1.

In some embodiments, the speakers to be driven to render the downmixed audio are assumed to be located in arbitrary locations in the playback environment; not merely in a (nominally) horizontal plane. In some such cases, metadata included in the program indicates rendering parameters for rendering at least one object of the program at any apparent spatial location (in a three dimensional volume) using a three-dimensional array of speakers. For example, an object channel may have corresponding metadata indicating a three-dimensional trajectory of apparent spatial positions at which the object (indicated by the object channel) is to be rendered. The trajectory may include a sequence of "floor" locations (in the plane of a subset of speakers which are assumed to be located in a floor plane of the playback environment), and a sequence of "above-floor" locations (each determined by driving a subset of the speakers which are assumed to be located in at least one other horizontal plane of the playback environment). In such cases, the rendering can be performed in accordance with the present invention so that the speakers can be driven to emit sound (determined by the relevant object channel) that will be perceived as emitting from a sequence of object locations in the three-dimensional space which includes the trajectory, mixed with sound determined by speaker channel content. Subsystem 24 may be configured to implement such rendering, or steps thereof, with remaining steps of the rendering being performed by a downstream system or device (e.g., rendering subsystem 35 of FIG. 6).

Optionally, a digital audio processing (DAP) stage (e.g., one for each of a number of predetermined output (downmixed) speaker channel configurations) is coupled to the output of spatial rendering subsystem 24 to perform post-processing on the output of the spatial rendering subsystem. Examples of such processing include intelligent equalization or (in case of a stereo output) speaker virtualization processing.

The output of the FIG. 6 system (e.g., the output of the spatial rendering subsystem, or a DAP stage following the spatial rendering stage) may be PCM bitstreams (which determine speaker feeds for the available speakers). For example, in the case that the user's playback system includes a 7.1 array of speakers, the system may output PCM bitstreams (generated in subsystem 24) which determine speaker feeds for the speakers of such array, or a post-processed version (generated in DAP 25) of such bitstreams. For another example, in the case that the user's playback system includes a 5.1 array of speakers, the system may output PCM bitstreams (generated in subsystem 24) which determine speaker feeds for the speakers of such array, or a post-processed version (generated in DAP 26) of such bitstreams. For another example, in the case that the user's playback system includes only left and right speakers, the system may output PCM bitstreams (generated in subsystem 24) which determine speaker feeds for the left and right speakers, or a post-processed version (generated in DAP 27) of such bitstreams.

The FIG. 6 system optionally also includes one or both of re-encoding subsystems 31 and 33. Re-encoding subsystem 31 is configured to re-encode the PCM bitstream (indicative of feeds for a 7.1 speaker array) output from DAP 25 as an E-AC-3 encoded bitstream, and the resulting encoded (compressed) E-AC-3 bitstream may be output from the system. Re-encoding subsystem 33 is configured to re-encode the PCM bitstream (indicative of feeds for a 5.1 speaker array) output from DAP 27 as an AC-3 or E-AC-3 encoded bitstream, and the resulting encoded (compressed) AC-3 or E-AC-3 bitstream may be output from the system.

The FIG. 6 system optionally also includes re-encoding (or formatting) subsystem 29 and downstream rendering subsystem 35 coupled to receive the output of subsystem 29. Subsystem 29 is coupled to receive data (output from subsystem 22) indicative of the selected audio objects (or default mix of audio objects), corresponding object related metadata, and the decoded speaker channels (e.g., bed speaker channels and replacement speaker channels), and is configured to re-encode (and/or format) such data for rendering by subsystem 35. Subsystem 35, which may be implemented in an AVR or soundbar (or other system or device downstream from subsystem 29), is configured to generate speaker feeds (or bitstreams which determine speaker feeds) for the available playback speakers (speaker array 36), in response to the output of subsystem 29. For example, subsystem 29 may be configured to generate encoded audio, by re-encoding the data indicative of the selected (or default) audio objects, corresponding metadata (including conditional rendering metadata), and speaker channels, into a suitable format for rendering in subsystem 35, and to transmit the encoded audio (e.g., via an HDMI link) to subsystem 35. In response to speaker feeds generated by (or determined by the output of) subsystem 35, the available speakers 36 would emit sound indicative of a mix of the speaker channel content and the selected (or default) object(s), with the object(s) having apparent source location(s) determined by object related metadata of subsystem 29's output. When subsystems 29 and 35 are included, rendering subsystem 24 is optionally omitted from the system.

In some embodiments, the invention is a distributed system for rendering object based audio, in which a portion (i.e., at least one step) of the rendering (e.g., selection of audio objects to be rendered and selection of characteristics of the rendering of each selected object, as performed by subsystem 22 and controller 23 of the FIG. 6 system) is implemented in a first subsystem (e.g., elements 20, 22, and 23 of FIG. 6, implemented in a set top device, or a set top device and a handheld controller) and another portion of the rendering (e.g., immersive rendering in which speaker feeds, or signals which determine speaker feeds, are generated in response to the output of the first subsystem) is implemented in a second subsystem (e.g., subsystem 35, implemented in an AVR or soundbar). Some embodiments which provide distributed rendering also implement latency management to account for the different times at which and different subsystems in which portions of the audio render (and any processing of video which corresponds to the audio being rendered) are performed.

In some embodiments of the inventive playback system, each decoder and object processing subsystem (sometimes referred to as a personalization engine) are implemented in a set top device (STB). For example, elements 20 and 22 of FIG. 6, and/or all elements of the FIG. 7 system may be implemented in an STB. In some embodiments of the inventive playback system, multiple renderings are performed on the output of the personalization engine to ensure that all STB outputs (e.g., HDMI, S/PDIF, and stereo analog outputs of the STB) are enabled. Optionally, selected object channels (and corresponding object related metadata) and speaker channels are passed on (with the decoded bed of speaker channels) from the STB to a downstream device (e.g., an AVR or soundbar) configured to render a mix of the object channels and the speaker channels.

Figure 7:
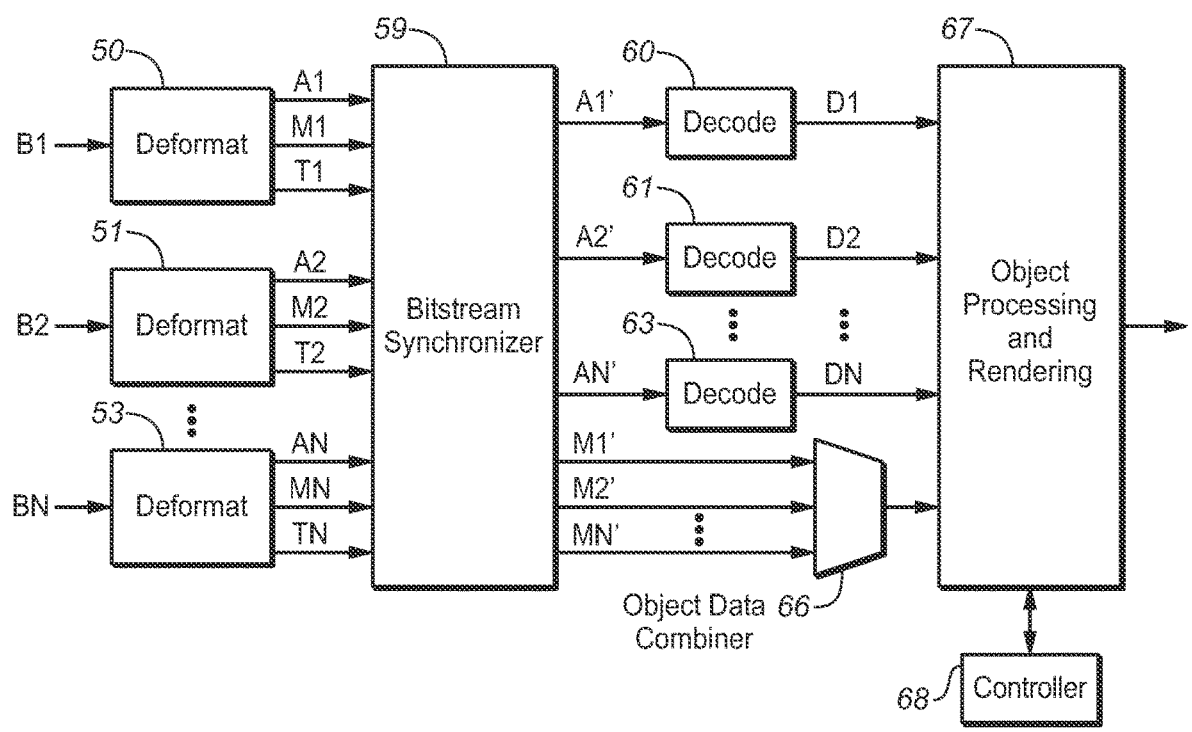
FIG. 7 is a block diagram of a playback system which may be configured to perform an embodiment of the inventive method.

In a class of embodiments, the inventive object based audio program includes a set of bitstreams (multiple bitstreams, which may be referred to as "substreams") which are generated and transmitted in parallel. In some embodiments in this class, multiple decoders are employed to decode content of the substreams (e.g., the program includes multiple E-AC-3 substreams and the playback system employs multiple E-AC-3 decoders to decode content of the substreams). FIG. 7 is a block diagram of a playback system configured to decode and render an embodiment of the inventive object based audio program which comprises multiple serial bitstreams which are delivered in parallel.

The playback system of FIG. 7 is a variation on the FIG. 6 system in which the object based audio program includes multiple bitstreams (B1, B2, . . . , BN, where N is some positive integer) which are delivered to the playback system in parallel and received by the playback system. Each of bitstreams ("substreams") B1, B2, . . . , and BN is a serial bitstream which includes time codes or other synchronization words (referred to as "sync words" for convenience with reference to FIG. 7) to allow the substreams to be synchronized or time aligned with each other. Each substream also includes a different subset of a full set of object channels and corresponding object related metadata, and at least one of the substreams includes speaker channels (e.g., bed speaker channels and replacement speaker channels). For example, in each of substreams B1, B2, . . . , BN, each container which includes object channel content and object related metadata includes a unique ID or time stamp.

The FIG. 7 system includes N deformatters 50, 51, . . . , 53, each coupled and configured to parse a different one of the input substreams, and to assert the metadata (including the synch words thereof) and audio content thereof to bitstream synchronization stage 59.

Deformatter 50 is configured to parse substream B1, and to assert the sync words (T1) thereof, other metadata and object channel content (M1) thereof (including conditional rendering metadata and other object related metadata, and at least one object channel of the program), and speaker channel audio content (A1) thereof (including at least one speaker channel of the program) to bitstream synchronization stage 59. Similarly, deformatter 51 is configured to parse substream B2, and to assert the sync words (T2) thereof, other metadata and object channel content (M2) thereof (including conditional rendering metadata and other object related metadata and at least one object channel of the program), and speaker channel audio content (A2) thereof (including at least one speaker channel of the program) to bitstream synchronization stage 59. Similarly, deformatter 53 is configured to parse substream BN, and to assert the sync words (TN) thereof, other metadata and object channel content (MN) thereof (including conditional rendering metadata and other object related metadata and at least one object channel of the program), and speaker channel audio content (AN) thereof (including at least one speaker channel of the program) to bitstream synchronization stage 59.

Bitstream synchronization stage 59 of the FIG. 7 system typically includes buffers for the audio content and metadata of the substreams B1, B2, . . . , BN, and a stream offset compensation element which is coupled and configured to use the sync words of each of the substreams to determine any misalignment of data in the input substreams (e.g., which may occur due to the likelihood that tight synchronism among them is lost in distribution/contribution since each bitstream is typically carried over an independent interface and/or track within a media file). The stream offset compensation element of stage 59 is typically also configured to correct any determined misalignment by asserting appropriate control values to the buffers containing the audio data and metadata of the bitstreams, to cause time-aligned bits of the speaker channel audio data to be read from the buffers to decoders (including decoders 60, 61, and 63), each of which is coupled to a corresponding one of the buffers, and to cause time-aligned bits of the object channel audio data and metadata to be read from the buffers to object data combining stage 66.

Time-aligned bits of speaker channel audio content A1' from substream B1 are read from stage 59 to decoder 60, and time-aligned bits of object channel content and metadata M1' from substream B1 are read from stage 59 to metadata combiner 66. Decoder 60 is configured to perform decoding on the speaker channel audio data asserted thereto, and to assert the resulting decoded speaker channel audio to object processing and rendering subsystem 67.

Similarly, time-aligned bits of speaker channel audio content A2' from substream B2 are read from stage 59 to decoder 61, and time-aligned bits of object channel content and metadata M2' from substream B2 are read from stage 59 to metadata combiner 66. Decoder 61 is configured to perform decoding on the speaker channel audio data asserted thereto, and to assert the resulting decoded speaker channel audio to object processing and rendering subsystem 67.

Similarly, time-aligned bits of speaker channel audio content AN' from substream BN are read from stage 59 to decoder 63, and time-aligned bits of object channel content and metadata MN' from substream BN are read from stage 59 to metadata combiner 66. Decoder 63 is configured to perform decoding on the speaker channel audio data asserted thereto, and to assert the resulting decoded speaker channel audio to object processing and rendering subsystem 67.

For example, each of substreams B1, B2, . . . , BN may be an E-AC-3 substream, and each of decoders 60, 61, 63, and any other decoder(s) coupled to subsystem 59 in parallel with decoders 60, 61, and 63, may be an E-AC-3 decoder configured to decode speaker channel content of one of the input E-AC-3 substreams.

Object data combiner 66 is configured to assert the time-aligned object channel data and metadata for all the object channels of the program in an appropriate format to object processing and rendering subsystem 67.

Subsystem 67 is coupled to the output of combiner 66 and to the outputs of decoders 60, 61, and 63 (and any other decoder(s) coupled in parallel with decoders 60, 61, and 63 between subsystems 59 and 67), and controller 68 is coupled to subsystem 67. Subsystem 67 is typically configured to perform object processing on the outputs of combiner 66 and the decoders (e.g., including the steps performed by subsystem 22 of the FIG. 6 system, or variations on such steps) in an interactive manner in accordance with an embodiment of the invention, in response to control data from controller 68. Controller 68 may be configured to perform the operations which controller 23 of the FIG. 6 system is configured to perform (or variations on such operations) in response to input from a user. Subsystem 67 is typically also configured to perform rendering on speaker channel audio and object channel audio data asserted thereto (e.g., the operations performed by rendering subsystem 24, or subsystems 24, 25, 26, 31, and 33 of the FIG. 6 system, or subsystems 24, 25, 26, 31, 33, 29, and 35 of the FIG. 6 system, or variations on such operations) in accordance with an embodiment of the invention (e.g., to render a mix of bed speaker channel content, replacement speaker channel content, and object channel content).

In one implementation of the FIG. 7 system, each of substreams B1, B2, . . . , BN is a Dolby E bitstream. Each such Dolby E bitstream comprises a sequence of bursts. Each burst may carry speaker channel audio content (content of bed speaker channels and/or replacement speaker channels) and a subset of a full object channel set (which may be a large set) of the inventive object channels and object related metadata (i.e., each burst may indicate some object channels of the full object channel set and corresponding object related metadata including conditional rendering metadata). Each burst of a Dolby E bitstream typically occupies a time period equivalent to that of a corresponding video frame. Each Dolby E bitstream in the set includes synchronization words (e.g., time codes) to allow the bitstreams in the set to be synchronized or time aligned with each other. For example, in each bitstream, each container including object channel content and object related metadata (including conditional rendering metadata) could include a unique ID or time stamp to allow the bitstreams in the set to be synchronized or time aligned with each other. In the noted implementation of the FIG. 7 system, each of deformatters 50, 51, and 53 (and any other deformatter(s) coupled in parallel with deformatters 50, 51, and 53) is an SMPTE 337 deformatter, and each of decoders 60, 61, 63, and any other decoder(s) coupled to subsystem 59 in parallel with decoders 60, 61, and 63, may be a Dolby E decoder.

In some embodiments of the invention, object related metadata of an object based audio program includes durable metadata. For example, the object related metadata included in the program input to subsystem 20 of the FIG. 6 system may include non-durable metadata (e.g., a default level and/or rendering position or trajectory, for a user-selectable object) which can be changed at at least one point in the broadcast chain (from the content creation facility which generated the program to the user interface implemented by controller 23) and durable metadata which is not intended to be changeable (or cannot be changed) after initial generation of the program (typically, in a content creation facility). Examples of durable metadata include: conditional rendering metadata for each user-selectable object or other object or set of objects of the program; an object ID for each user-selectable object or other object or set of objects of the program; and time codes or other synchronization words indicative of timing of each user-selectable object, or other object, relative to speaker channel content or other elements of the program. Durable metadata is typically preserved throughout the entire broadcast chain from content creation facility to user interface, throughout the entire duration of a broadcast of the program or even also during re-broadcasts of the program. In some embodiments, the audio content (and associated metadata) of at least one user-selectable object is sent in a main mix of the object based audio program, and at least some durable metadata (e.g., time codes) and optionally also audio content (and associated metadata) of at least one other object is sent in a side mix of the program.

Durable, object related metadata in some embodiments of the inventive object based audio program is employed to preserve (e.g., even after broadcast of the program) a user selected mix of object content and speaker channel content. For example, this may provide the selected mix as a default mix each time the user a program of a specific type (e.g., any soccer game) or each time the user watches any program (of any type), until the user changes his/her selection. For example, during broadcast of a first program, the user may employ controller 23 (of the FIG. 6 system) to select a mix including an object having a durable ID (e.g., an object identified by controller 23's user interface as a "home team crowd noise" object, where the durable ID indicates "home team crowd noise"). Then, each time the user watches (and listens to) another program (which includes an object having the same durable ID), the playback system will automatically render the program with the same mix (i.e., the bed speaker channels and/or replacement speaker channels of the program mixed with the program's "home team crowd noise" object channel), until the user changes the mix selection. Durable, object related metadata in some embodiments of the inventive object based audio program may cause rendering of some objects to be mandatory (e.g., despite a user desire to defeat such rendering) during an entire program.

In some embodiments, object related metadata provides a default mix of object content and speaker channel content, with default rendering parameters (e.g., default spatial locations of rendered objects). For example, the object related metadata of the program input to subsystem 20 of the FIG. 6 system may be default mix of object content and speaker channel content, with default rendering parameters, and subsystems 22 and 24 will cause the program to be rendered with default mix, and with the default rendering parameters, unless a user employs controller 23 to select another mix of object content and speaker channel content and/or another set of rendering parameters.

In some embodiments, object related metadata (including conditional rendering metadata) provides a set of selectable "preset" mixes of objects and speaker channel content, each preset mix having a predetermined set of rendering parameters (e.g., spatial locations of rendered objects). These may be presented by a user interface of the playback system as a limited menu or palette of available mixes (e.g., a limited menu or palette displayed by controller 23 of the FIG. 6 system). Each preset mix (and/or each selectable object) may have a durable ID (e.g., name, label or logo). Controller 23 (or the controller of another embodiment of the inventive playback system) may be configured to display an indication of such ID (e.g., on the touch screen of an iPad implementation of controller 23). For example, there may be a selectable "home team" mix with an ID (e.g., a team logo) that is durable, regardless of changes (e.g., made by the broadcaster) to details of the audio content or nondurable metadata of each object of the preset mix.

In some embodiments, object related metadata of a program (or a preconfiguration of the playback or rendering system, not indicated by metadata delivered with the program) provides constraints or conditions on selectable mixes of objects and bed (speaker channel) content. For example, an implementation of the FIG. 6 system may implement digital rights management (DRM), and more specifically may implement a DRM hierarchy to allow a user of the FIG. 6 system to have "tiered" access to a set of audio objects included in an object based audio program. If the user (e.g., a customer associated with the playback system) pays more money (e.g., to the broadcaster), the user may be authorized to decode and select (and hear) more audio objects of the program.

For another example, object related metadata may provide constraints on user selection of objects. An example of such a constraint is that if a user employs controller 23 to select for rendering both a "home team crowd noise" object and a "home team announcer" object of a program (i.e., for inclusion in the mix determined by subsystem 24 of FIG. 6), metadata included in the program may ensure that subsystem 24 causes the two selected objects to be rendered with predetermined relative spatial locations. The constraints may be determined (at least in part) by data (e.g., user-entered data) regarding the playback system. For example, if the playback system is a stereo system (including only two speakers), object processing subsystem 24 (and/or controller 23) of the FIG. 6 system may be configured to prevent user selection of mixes (identified by object related metadata) that cannot be rendered with adequate spatial resolution by only two speakers. For another example, object processing subsystem 24 (and/or controller 23) of the FIG. 6 system may remove some delivered objects from the category of selectable objects for legal (e.g., DRM) reasons or other reasons (e.g. based on bandwidth of the delivery channel) indicated by object related metadata (and/or other data entered to the playback system). The user may pay the content creator or broadcaster for more bandwidth, and as a result the system (e.g., object processing subsystem 24 and/or controller 23 of the FIG. 6 system) may allow the user to select from a larger menu of selectable objects and/or object/bed mixes.

Some embodiments of the invention (e.g., implementations of the playback system of FIG. 6 which include above-described elements 29 and 35) implement distributed rendering. For example, default or selected object channels (and corresponding object related metadata) of a program are passed on (with decoded speaker channels, e.g., a selected set of bed speaker channels and replacement speaker channels) from a set top device (e.g., from subsystems 22 and 29 of an implementation of the FIG. 6 system) to a downstream device (e.g., subsystem 35 of FIG. 6, implemented in an AVR or soundbar downstream from the set top device (STB) in which subsystems 22 and 29 are implemented). The downstream device is configured to render a mix of the object channels and speaker channels. The STB may partially render the audio and the downstream device may complete the rendering (e.g., by generating speaker feeds for driving a specific top tier of speakers (e.g., ceiling speakers) to place an audio object in a specific apparent source position, where the STB's output merely indicates that the object can be rendered in some unspecified way in some unspecified top tier of speakers). For example, the STB may not have knowledge of the specific organization of the speakers of the playback system, but the downstream device (e.g., AVR or soundbar) may have such knowledge.

In some embodiments, the object based audio program (e.g., the program input to subsystem 20 of the FIG. 6 system, or to elements 50, 51, and 53 of the FIG. 7 system) is or includes at least one AC-3 (or E-AC-3) bitstream, and each container of the program which includes object channel content (and/or object related metadata including conditional rendering metadata) is included in an auxdata field (e.g., the AUX segment shown in FIG. 1 or FIG. 4) at the end of a frame of the bitstream. In some such embodiments, each frame of the AC-3 or E-AC-3 bitstream includes one or two metadata containers. One container can be included in the Aux field of the frame, and another container can be included in the addbsi field of the frame. Each container has a core header and includes (or is associated with) one or more payloads. One such payload (of or associated with a container included in the Aux field) may be a set of audio samples of each of one or more of the inventive object channels (related to a bed of speaker channels which is also indicated by the program) and the object related metadata (including conditional rendering metadata) associated with each object channel. The core header of each container typically includes at least one ID value indicating the type of payload(s) included in or associated with the container; substream association indications (indicating which substreams the core header is associated with); and protection bits. Typically, each payload has its own header (or "payload identifier"). Object level metadata may be carried in each substream which is an object channel.

In other embodiments, the object based audio program (e.g., the program input to subsystem 20 of the FIG. 6 system, or to elements 50, 51, and 53 of the FIG. 7 system) is or includes a bitstream which is not an AC-3 bitstream or an E-AC-3 bitstream. In some embodiments, the object based audio program is or includes at least one Dolby E bitstream, and the object channel content and object related metadata of the program (e.g., each container of the program which includes object channel content and/or object related metadata including conditional rendering metadata) is included in bit locations of the Dolby E bitstream that conventionally do not conventionally carry useful information. Each burst of a Dolby E bitstream occupies a time period equivalent to that of a corresponding video frame. The object channels (and/or object related metadata) may be included in the guard bands between Dolby E bursts and/or in the unused bit locations within each of data structures (each having the format of an AES3 frame) within each Dolby E burst. For example, each guard band consists of a sequence of segments (e.g., 100 segments), each of the first X segments (e.g., X=20) of each guard band includes the object channels and object related metadata, and each of the remaining segments of said each guard band may include a guard band symbol. In some embodiments, at least some of the object channels (and/or object related metadata including conditional rendering metadata) of the inventive program is included in the four least significant bits (LSBs) of each of the two AES3 subframes of each of at least some of the AES3 frames of a Dolby E bitstream, and the data indicative of the program's speaker channels is included in the 20 most significant bits (MSBs) of each of the two AES3 subframes of each AES3 frame of the bitstream.

In some embodiments, the object channels and/or object related metadata of the inventive program are included in metadata containers in a Dolby E bitstream. Each container has a core header and includes (or is associated with) one or more payloads. One such payload (of or associated with a container included in the Aux field) may be a set of audio samples of each of one or more of the inventive object channels (e.g., related to a bed of speaker channels which is also indicated by the program) and the object related metadata associated with each object channel. The core header of each container typically includes at least one ID value indicating the type of payload(s) included in or associated with the container; substream association indications (indicating which substreams the core header is associated with); and protection bits. Typically, each payload has its own header (or "payload identifier"). Object level metadata may be carried in each substream which is an object channel.

In some embodiments, the object based audio program (e.g., the program input to subsystem 20 of the FIG. 6 system, or to elements 50, 51, and 53 of the FIG. 7 system) is decodable, and the speaker channel content thereof is renderable, by a legacy decoder and legacy rendering system (which is not configured to parse the inventive object channels and object related metadata). The same program may be rendered in accordance with some embodiments of the invention by set top device (or other decoding and rendering system) which is configured (in accordance with an embodiment of the invention) to parse the inventive object channels and object related metadata and render a mix of speaker channel and object channel content indicated by the program.

Some embodiments of the invention are intended to provide a personalized (and preferably immersive) audio experience for end consumers in response to a broadcast program, and/or to provide new methods for using metadata in a broadcast pipeline. Some embodiments improve microphone capture (e.g., stadium microphone capture) to generate audio programs which provide a more personalizable and immersive experience for the end consumer, modify existing production, contribution and distribution workflows to allow object channel(s) and metadata of the inventive object based audio program(s) to flow through the professional chain, and create a new playback pipeline (e.g., one implemented in a set top device) that supports object channel(s), replacement speaker channels, and related metadata as well as conventionally broadcast audio (e.g., the bed of speaker channels included in embodiments of the inventive broadcast audio program).

Figure 8:
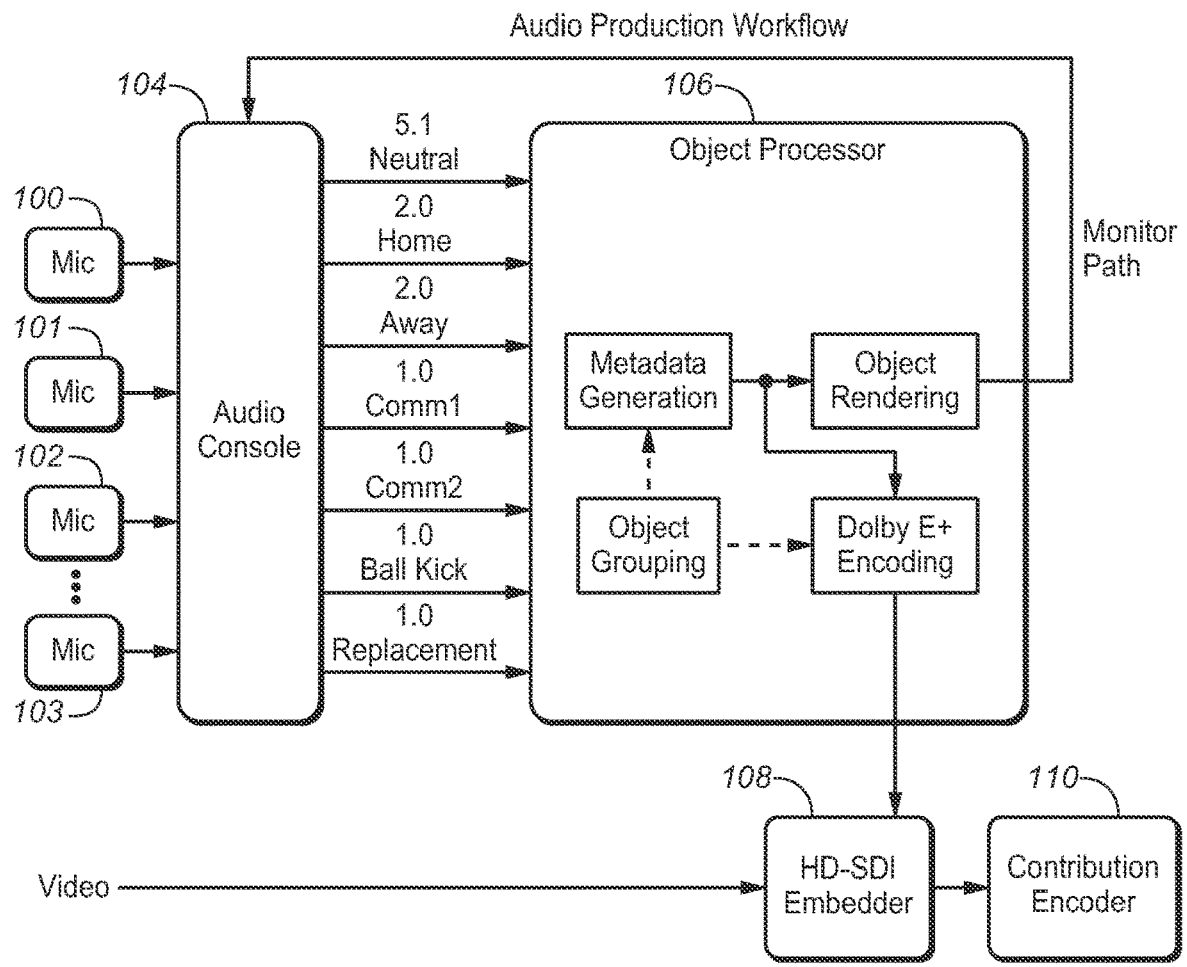
FIG. 8 is a block diagram of a broadcast system configured to generate an object based audio program (and a corresponding video program) in accordance with an embodiment of the invention.

FIG. 8 is a block diagram of a broadcast system configured to generate an object based audio program (and a corresponding video program) in accordance with an embodiment of the invention, for broadcast. A set of X microphones (where X is an integer), including microphones 100, 101, 102, and 103, of the FIG. 8 system are positioned to capture audio content to be included in the program, and their outputs are coupled to inputs of audio console 104.

In a class of embodiments, the program includes interactive audio content which is indicative of the atmosphere in or at, and/or commentary on a spectator event (e.g., a soccer or rugby game, a car or motorcycle race, or another sporting event). In some embodiments, the audio content of the program is indicative of multiple audio objects (including user-selectable objects or object sets, and typically also a default set of objects to be rendered in the absence of object selection by the user), a bed of speaker channels (indicative of a default mix of captured content), and replacement speaker channels. The bed of speaker channels may be a conventional mix (e.g., a 5.1 channel mix) of speaker channels of a type that might be included in a conventional broadcast program which does not include an object channel.

In other embodiments, an object based audio program generated or rendered in accordance with the invention is indicative of "man-made" (e.g., digitally created) content rather than or as well as captured audio content. For example, the content may consist of or include non-live (post-produced) content (e.g., synthesized audio).

A subset of the microphones (e.g., microphones 100 and 101 and optionally also other microphones whose outputs are coupled to audio console 104) is a conventional array of microphones which, in operation, captures audio (to be encoded and delivered as a bed of speaker channels, and a set of replacement speaker channels). In operation, another subset of the microphones (e.g., microphones 102 and 103 and optionally also other microphones whose outputs are coupled to audio console 104) captures audio (e.g., crowd noise and/or other "objects") to be encoded and delivered as object channels of the program. For example, the microphone array of the FIG. 8 system may include: at least one microphone (e.g., microphone 100) implemented as a soundfield microphone and permanently installed in a stadium (e.g., a soundfield microphone having a heater installed with it); at least one stereo microphone (e.g., microphone 102, implemented as a Sennheiser MKH416 microphone or another stereo microphone) pointed at the location of spectators who support one team (e.g., the home team), and at least one other stereo microphone (e.g., microphone 103, implemented as a Sennheiser MKH416 microphone or another stereo microphone) pointed at the location of spectators who support the other team (e.g., the visiting team).

The inventive broadcasting system may include a mobile unit (which may be a truck, and is sometimes referred to as a "match truck") located outside of a stadium (or other event location), which is the first recipient of audio feeds from microphones in the stadium (or other event location). The match truck generates the object based audio program (to be broadcast) including by encoding audio content from microphones for delivery as object channels of the program, generating corresponding conditional rendering metadata and other object related metadata (e.g., metadata indicative of spatial location at which each object should be rendered in a permitted downmix) and including such metadata in the program, and encoding audio content from some microphones for delivery as a bed of speaker channels (and a set of replacement speaker channels) of the program.

For example, in the FIG. 8 system, console 104, object processing subsystem 106 (coupled to the outputs of console 104), embedding subsystem 108, and contribution encoder 110 may be installed in a match truck. The object based audio program generated in subsystem 106 may be combined (e.g., in subsystem 108) with video content (e.g., from cameras positioned in the stadium) to generate a combined audio and video signal which is then encoded (e.g., by encoder 110), thereby generating an encoded audio/video signal for broadcast (e.g., by delivery subsystem 5 of FIG. 5). It should be understood that a playback system which decodes and renders such an encoded audio/video signal would include a subsystem (not specifically shown in the drawings) for parsing the audio content and the video content of the delivered audio/video signal, and a subsystem (e.g., one similar or identical to the FIG. 6 system) for decoding and rendering the audio content in accordance with an embodiment of the invention, and another subsystem (not specifically shown in the drawings) for decoding and rendering the video content.

The audio output of console 104 may include a 5.1 speaker channel bed (labeled "5.1 neutral" in FIG. 8) indicative of a default mix of ambient sound captured at a sporting event, and commentary by an announcer (non-ambient content) mixed into its center channel, a replacement speaker channel (labeled "1.0 replacement" in FIG. 8) indicative of the ambient content of the center channel of the bed without the commentary (i.e., the captured ambient sound content of the bed's center channel before the commentary is mixed therewith to generate the bed's center channel), audio content of a stereo object channel (labeled "2.0 home") indicative of crowd noise from the home team's fans who are present at the event, audio content of a stereo object channel (labeled "2.0 away") indicative of crowd noise from the visiting team's fans who are present at the event, object channel audio content (labeled "1.0 comm1") indicative of commentary by an announcer from the home team's city, object channel audio content (labeled "1.0 comm2") indicative of commentary by an announcer from the visiting team's city, and object channel audio content (labeled "1.0 ball kick") indicative of sound produced by a game ball as it is struck by sporting event participants.

Object processing subsystem 106 is configured to organize (e.g., group) audio streams from console 104 into object channels (e.g., to group the left and right audio streams labeled "2.0 away" into a visiting crowd noise object channel) and/or sets of object channels, to generate object related metadata indicative of the object channels (and/or object channel sets), and to encode the object channels (and/or object channel sets), object related metadata, the speaker channel bed, and each replacement speaker channel (determined from audio streams from console 104) as an object based audio program (e.g., an object based audio program encoded as a Dolby E bitstream). Typically also, subsystem 106 is configured to render (and play on a set of studio monitor speakers) at least a selected subset of the object channels (and/or object channel sets) and the speaker channel bed and/or replacement speaker channel(s) (including by using the object related metadata to generate a mix indicative of the selected object channel(s) and speaker channels) so that the played back sound can be monitored by the operator(s) of console 104 and subsystem 106 (as indicated by the "monitor path" of FIG. 8).

The interface between subsystem 104's outputs and subsystem 106's inputs may be a multichannel audio digital interface ("MADI").

In operation, subsystem 108 of the FIG. 8 system combines the object based audio program generated in subsystem 106 with video content (e.g., from cameras positioned in a stadium) to generate a combined audio and video signal which is asserted to encoder 110. The interface between subsystem 108's output and subsystem 110's input may be a high definition serial digital interface ("HD-SDI"). In operation, encoder 110 encodes the output of subsystem 108, thereby generating an encoded audio/video signal for broadcast (e.g., by delivery subsystem 5 of FIG. 5).

In some embodiments, a broadcast facility is (e.g., subsystems 106, 108, and 110 of the FIG. 8 system are) configured to generate multiple object based audio programs (e.g., object based audio programs indicated by multiple encoded audio/video signals output from subsystem 110 of FIG. 8) indicative of captured sound. Examples of such object based audio programs include a 5.1 flattened mix, an international mix, and a domestic mix. For example, all the programs may include a common bed of speaker channels (and a common set of replacement speaker channels), but the object channels of the programs (and/or the menu of selectable object channels determined by the programs, and/or selectable or nonselectable rendering parameters for rendering and mixing the object channels) may differ from program to program.

In some embodiments, a facility of a broadcaster or other content creator (e.g., subsystems 106, 108, and 110 of the FIG. 8 system) is configured to generate a single object based audio program (i.e., a master) which can be rendered in any of a variety of different playback environments (e.g., 5.1 channel domestic playback systems, 5.1 channel international playback systems, and stereo playback systems). The master does not need to be mixed (e.g., downmixed) for broadcast to consumers in any specific environment.

As noted above, in some embodiments of the invention, object related metadata of a program (or a preconfiguration of the playback or rendering system, not indicated by metadata delivered with the program) provides constraints or conditions on selectable mixes of objects and speaker channel content. For example, an implementation of the FIG. 6 system may implement a DRM hierarchy to allow a user to have tiered access to a set of object channels included in an object based audio program. If the user pays more money (e.g., to the broadcaster), the user may be authorized to decode, select, and render more object channels of the program.

Figure 9:
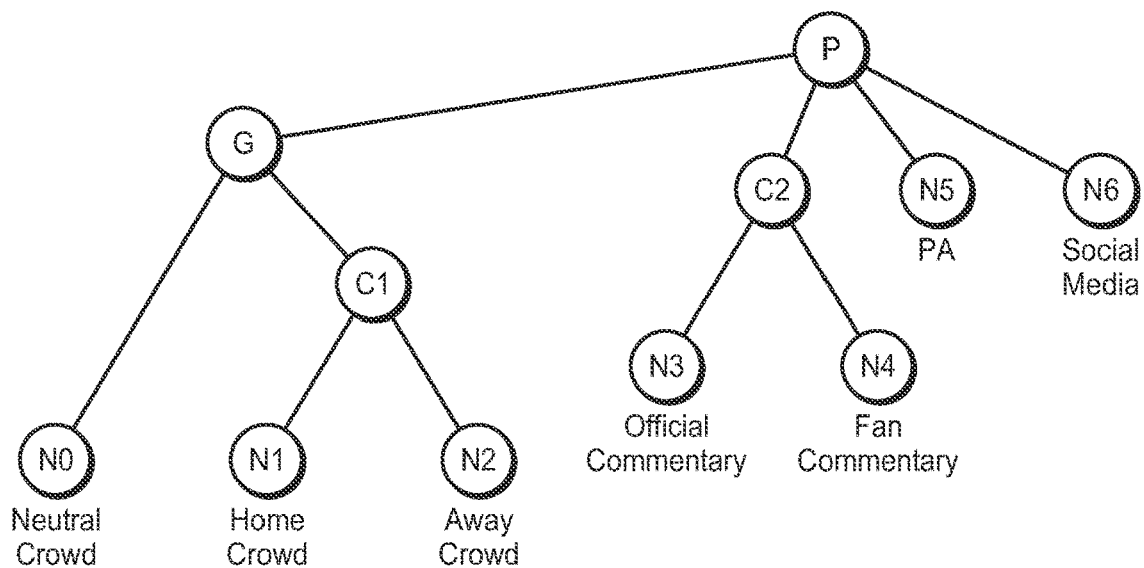
FIG. 9 is a diagram of relationships between object channels of an embodiment of the inventive program, indicating which subsets of the object channels are selectable by a user.

Examples of constraints and conditions on user selection of objects (or groups of objects) will be described with reference to FIG. 9. In FIG. 9, program "P0" includes seven object channels: object channel "N0" indicative of neutral crowd noise, object channel "N1" indicative of home crowd noise, object channel "N2" indicative of away crowd noise, object channel "N3" indicative of official commentary (e.g. broadcast commentary by a commercial radio announcer) on an event, object channel "N4" indicative of fan commentary on the event, object channel "N5" indicative of public address announcements at the event, and object channel "N6" indicative of an incoming twitter connection (converted via a text-to-speech system) pertaining to the event.

Default indicating metadata included in program P0 indicates a default object set (one or more "default" objects) and default rendering parameter set (e.g., the spatial position of each default object in the default object set) to be included (by default) in a rendered mix of "bed" speaker channel content and object channel content indicated by the program. For example, the default object set may be a mix of object channel "N0" (indicative of neutral crowd noise) rendered in a diffuse manner (e.g., so as not to be perceived as emitting from any specific source location) and object channel "N3" (indicative of official commentary) rendered so as to be perceived as emitting from a source location directly in front of the listener (i.e., at an azimuth of 0 degrees with respect to the listener).

Program P0 (of FIG. 9) also includes metadata indicating multiple sets of user selectable preset mixes, each preset mix determined by a subset of the object channels of the program and a corresponding rendering parameter set. The user selectable preset mixes may be presented as a menu on a user interface of a controller of the playback system (e.g., a menu displayed by controller 23 of the FIG. 6 system). For example, one such preset mix is a mix of object channel "N0" of FIG. 9 (indicative of neutral crowd noise) and object channel "N1" (indicative of home crowd noise) and object channel "N4" (indicative of fan commentary), rendered so that the channel N0 and N1 content in the mix is perceived as emitting from a source location directly behind the listener (i.e . . . , at an azimuth of 180 degrees with respect to the listener), with the level of channel N1 content in the mix being 3 dB less than the level of channel N0 in the mix, and with the channel N4 content in the mix rendered in a diffuse manner (e.g., so as not to be perceived as emitting from any specific source location).

The playback system may implement a rule (e.g., a grouping rule "G" indicated in FIG. 9, determined by metadata of the program) that each user selectable preset mix that includes at least one of object channels N0, N1, and N2 must include content of object channel N0 alone, or content of object channel N0 mixed with content of at least one of object channels N1 and N2. The playback system may also implement a rule (e.g., a condition rule "C1" indicated in FIG. 9, determined by metadata of the program) that each user selectable preset mix that includes content of object channel N0 mixed with content of at least one of object channels N1 and N2 must include content of object channel N0 mixed with content of object channel N1, or it must include content of object channel N0 mixed with content of object channel N2.

The playback system may also implement a rule (e.g., a condition rule "C2" indicated in FIG. 9, determined by metadata of the program) that each user selectable preset mix that includes content of at least one of object channels N3 and N4 must include either content of object channel N3 alone, or it must include content of object channel N4 alone.

Some embodiments of the invention implement conditional decoding (and/or rendering) of object channels of an object based audio program. For example, the playback system may be configured to allow object channels to be conditionally decoded based on conditional rendering metadata provided with a program, and data indicative of playback speaker array configuration and optionally also the user's rights. For example, if a DRM hierarchy is implemented to allow customers to have "tiered" access to a set of audio object channels included in an object based audio program, the playback system may be automatically configured (by control bits included in metadata of the program) to prevent decoding and selection for rendering of some of the objects unless the playback system is notified that the user has satisfied at least one condition (e.g., paying a specific amount of money to the content provider). For example, the user may need to purchase a right in order to listen to "official commentary" object channel N3 of program P0 of FIG. 9, and the playback system may implement condition rule "C2" indicated in FIG. 9 such that object channel N3 cannot be selected unless the playback system is notified that the user of the playback system has purchased the necessary right.

For another example, the playback system may be automatically configured (by control bits included in metadata of the program, indicating a specific configuration of the available playback speaker array) to prevent decoding and selection of some of the objects (for inclusion in a downmix of program content to be rendered) if the playback speaker array configuration does not meet a condition (e.g., the playback system may implement condition rule "C1" indicated in FIG. 9 such that a preset mix of object channels N0 and N1 cannot be selected unless the playback system is notified that a 5.1 speaker array is available for rendering the selected content, but not if the only available speaker array is a 2.0 speaker array).

In some embodiments, the invention implements rule based object channel selection, in which at least one predetermined rule determines which object channel(s) of an object based audio program are rendered (e.g., with a bed of speaker channels). The user may also specify at least one rule for object channel selection (e.g., by selecting from a menu of available rules presented by a user interface of a playback system controller), and the playback system (e.g., object processing subsystem 22 of the FIG. 6 system) may be configured to apply each such rule to determine which object channel(s) of an object based audio program to be rendered should be included in the mix to be rendered (e.g., by subsystem 24, or subsystems 24 and 35, of the FIG. 6 system). The playback system may determine from object related metadata (e.g., conditional rendering metadata) in the program which object channel(s) of the program satisfy the predetermined rule(s) (e.g., given the configuration of the playback speaker array).

For a simple example, consider the case that the object based audio program is indicative of a sporting event. Instead of manipulating a controller (e.g., controller 23 of FIG. 6) to perform static select of a specific set of objects included in the program (e.g., radio commentary from a specific team, or car, or bike), the user manipulates the controller to set up a rule (e.g., to automatically select, for rendering, object channels indicative of whatever team, or car, or bike is winning or in first place). The rule is applied by the playback system to implement dynamic selection (during rendering of a single program, or a sequence of different programs) of a sequence of different subsets of the objects (object channels) included in the program (e.g., a first subset of objects indicative of one team, automatically followed by a second subset of objects indicative of a second team upon the event that the second team makes a score and thus becomes the currently winning team). Thus, in some such embodiments, realtime events steer or influence which object channels are included in the rendered mix. The playback system (e.g., object processing subsystem 22 of the FIG. 6 system) may respond to metadata included in the program (e.g., metadata which indicates that at least one corresponding object is indicative of a currently winning team, e.g., is indicative of crowd noise of the team's fans or commentary of a radio announcer associated with the winning team) to select which object channel(s) should be included in the mix of speaker and object channels to be rendered. For example, the content creator may include (in an object based audio program) metadata indicative of a place order (or other hierarchy) of each of at least some audio object channels of the program (e.g., indicative of which object channels correspond to the team or car currently in first place, which object channels correspond to the team or car in second place, and so on). The playback system may be configured to respond to such metadata by selecting and rendering only the object channel(s) which satisfy a user specified rule (e.g., the object channel(s) relating to the team in "n"th place, as indicated by object related metadata of the program).

Examples of object related metadata regarding object channels of the inventive object based audio program include (but are not limited to): conditional rendering metadata or other metadata indicative of detailed information about how to render an object channel; dynamic temporal metadata (e.g., indicative of a trajectory for panning of an object, object size, gains, etc.); and metadata for use by an AVR (or other device or system downstream from decoding and object processing subsystems of some implementations of the inventive system) to render an object channel (e.g., with knowledge of the configuration of an available playback speaker array). Such metadata may specify constraints on object location, gain, muting, or other rendering parameters, and/or constraints on how objects interact with other objects (e.g., constraints on which additional objects may be selected given that a specific object is selected), and/or may specify default objects and/or default rendering parameters (to be used in the absence of user selection of other objects and/or rendering parameters).

In some embodiments, at least some object related metadata (and optionally also at least some of the object channels) of the inventive object based audio program are sent in a separate bitstream or other container (e.g., as a side mix for which a user might need to pay extra to receive and/or use) from the program's bed of speaker channels and conventional metadata. Without access to such object related metadata (or object related metadata and object channels), a user could decode and render the bed of speaker channels, but could not select audio objects of the program and could not render audio objects of the program in a mix with the audio indicated by the speaker channel bed. Each frame of the inventive object based audio program may include audio content of multiple object channels and corresponding object related metadata.

An object based audio program generated (or transmitted, stored, buffered, decoded, rendered, or otherwise processed) in accordance with some embodiments of the invention includes speaker channels, at least one object channel, and metadata (including conditional rendering metadata) indicative of a layered graph (sometimes referred to as a layered "mix graph") indicative of selectable mixes (e.g., all selectable downmixes) of the speaker channels and object channel(s). For example, the mix graph is indicative of each rule applicable to selection of subsets of the speaker and object channels. Typically, an encoded audio bitstream is indicative of at least some (i.e., at least a part) of the program's audio content (e.g., a bed of speaker channels and at least some of the program's object channels) and object related metadata (including the metadata indicative of the mix graph), and optionally also at least one additional encoded audio bitstream or file is indicative of some of the program's audio content and/or object related metadata.

The layered mix graph is indicative of nodes (each of which may be indicative of a selectable channel or set of channels, or a category of selectable channels or set of channels) and connections between the nodes (e.g., control interfaces to the nodes and/or rules for selecting channels), and includes essential data (a "base" layer) and optional (i.e., optionally omitted) data (at least one "extension" layer). Typically, the layered mix graph is included in one of the encoded audio bitstream(s) indicative of the program, and can be assessed by graph traversal (implemented by a playback system, e.g., the end user's playback system) to determine a default mix of channels and options for modifying the default mix.

Where the mix graph is representable as a tree graph, the base layer can be a branch (or two or more branches) of the tree graph, and each extension layer can be another branch (or another set of two or more branches) of the tree graph. For example, one branch of the tree graph (indicated by the base layer) may be indicative of selectable channels and sets of channels that are available to all end users, and another branch of the tree graph (indicated by an extension layer) may be indicative of additional selectable channels and/or sets of channels that are available only to some end users (e.g., such an extension layer may be provided only to only end users authorized to use it). FIG. 9 is an example of a tree graph which includes object channel nodes (e.g., nodes indicative of object channels N0, N1, N2, N3, N4, N5, and N6) and other elements of a mix graph.

Typically the base layer contains (is indicative of) the graph structure and control interfaces to the nodes of the graph (e.g., panning, and gain control interfaces). The base layer is necessary for mapping any user interaction to the decoding/rendering process.

Each extension layer contains (is indicative of) an extension to the base layer. The extensions are not immediately necessary for mapping user interaction to the decoding process and hence can be transmitted at a slower rate and/or delayed, or omitted.

In some embodiments, the base layer is included as metadata of an independent substream of the program (e.g., is transmitted as metadata of the independent substream).

An object based audio program generated (or transmitted, stored, buffered, decoded, rendered, or otherwise processed) in accordance with some embodiments of the invention includes speaker channels, at least one object channel, and metadata (including conditional rendering metadata) indicative of a mix graph (which may or may not be a layered mix graph) indicative of selectable mixes (e.g., all selectable downmixes) of the speaker channels and the object channel(s). An encoded audio bitstream (e.g., a Dolby E or E-AC-3 bitstream) is indicative of at least a portion of the program, and metadata indicative of the mix graph (and typically also the selectable object and/or speaker channels) is included in every frame of the bitstream (or in each frame of a subset of the frames of the bitstream). For example, each frame may include at least one metadata segment and at least one audio data segment, and the mix graph may be included in at least one metadata segment of each frame. Each metadata segment (which may be referred to as a "container") may have a format which includes a metadata segment header (and optionally also other elements), and one or more metadata payloads following the metadata segment header. Each metadata payload is itself identified by a payload header. The mix graph, if present in a metadata segment, is included in one of the metadata payloads of the metadata segment.

In another class of embodiments, an object based audio program generated (or transmitted, stored, buffered, decoded, rendered, or otherwise processed) in accordance with the invention includes substreams, and the substreams are indicative of at least one bed of speaker channels, at least one object channel, and object related metadata (including conditional rendering metadata). The object related metadata includes "substream" metadata (indicative of substream structure of the program and/or the manner in which the substreams should be decoded) and typically also a mix graph indicative of selectable mixes (e.g., all selectable downmixes) of the speaker channels and the object channel(s). The substream metadata may be indicative of which substreams of the program should be decoded independently of other substreams of the program, and which substreams of the program should be decoded in association with at least one other substream of the program.

For example, in some embodiments, an encoded audio bitstream is indicative of at least some (i.e., at least a part) of the program's audio content (e.g., at least one bed of speaker channels, at least one replacement speaker channel, and at least some of the program's object channels) and metadata (e.g., a mix graph and substream metadata, and optionally also other metadata), and at least one additional encoded audio bitstream (or file) is indicative of some of the program's audio content and/or metadata. In the case that each of the bitstreams is a Dolby E bitstream (or is encoded in a manner consistent with the SMPTE 337 format for carrying non-pcm data in an AES3 serial digital audio bitstream), the bitstreams can collectively be indicative of multiples of up to 8 channels of audio content, with each bitstream carrying up to 8 channels of audio data and typically also including metadata. Each of the bitstreams can be considered a substream of a combined bitstream indicative of all the audio data and metadata carried by all the bitstreams.

For another example, in some embodiments, an encoded audio bitstream is indicative of multiple substreams of metadata (e.g., a mix graph and substream metadata, and optionally also other object related metadata) and audio content of at least one audio program. Typically, each of the substreams is indicative of one or more of the program's channels (and typically also metadata). In some cases, multiple substreams of an encoded audio bitstream are indicative of audio content of several audio programs, e.g., a "main" audio program (which may be a multichannel program) and at least one other audio program (e.g., a program which is a commentary on the main audio program).

An encoded audio bitstream which is indicative of at least one audio program necessarily includes at least one "independent" substream of audio content. The independent substream is indicative of at least one channel of an audio program (e.g., the independent substream may be indicative of the five full range channels of a conventional 5.1 channel audio program). Herein, this audio program is referred to as a "main" program.

In some cases, an encoded audio bitstream is indicative of two or more audio programs (a "main" program and at least one other audio program). In such cases, the bitstream includes two or more independent substreams: a first independent substream indicative of at least one channel of the main program; and at least one other independent substream indicative of at least one channel of another audio program (a program distinct from the main program). Each independent bitstream can be independently decoded, and a decoder could operate to decode only a subset (not all) of the independent substreams of an encoded bitstream.

Optionally, an encoded audio bitstream which is indicative of a main program (and optionally also at least one other audio program) includes at least one "dependent" substream of audio content. Each dependent substream is associated with one independent substream of the bitstream, and is indicative of at least one additional channel of the program (e.g., the main program) whose content is indicated by the associated independent substream (i.e., the dependent substream is indicative of at least one channel of a program which is not indicated by the associated independent substream, and the associated independent substream is indicative of at least one channel of the program).

In an example of an encoded bitstream which includes an independent substream (indicative of at least one channel of a main program), the bitstream also includes a dependent substream (associated with the independent bitstream) which is indicative of one or more additional speaker channels of the main program. Such additional speaker channels are additional to the main program channel(s) indicated by the independent substream. For example, if the independent substream is indicative of standard format Left, Right, Center, Left Surround, Right Surround full range speaker channels of a 7.1 channel main program, the dependent substream may be indicative of the two other full range speaker channels of the main program.

In accordance with the E-AC-3 standard, a conventional E-AC-3 bitstream must be indicative of at least one independent substream (e.g., a single AC-3 bitstream), and may be indicative of up to eight independent substreams. Each independent substream of an E-AC-3 bitstream may be associated with up to eight dependent substreams.

Figure 11:
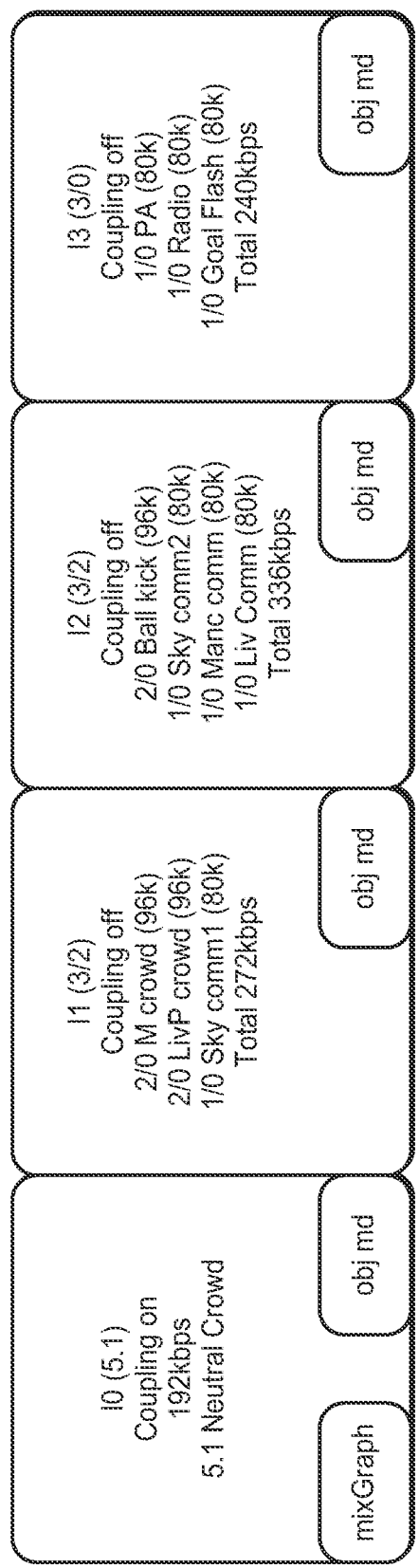
FIG. 11 is a diagram of content of an object based audio program generated in accordance with an embodiment of the invention.

In an exemplary embodiment (to be described with reference to FIG. 11), an object based audio program includes at least one bed of speaker channels, at least one object channel, and metadata. The metadata includes "substream" metadata (indicative of substream structure of audio content of the program and/or the manner in which substreams of audio content of the program should be decoded) and typically also a mix graph indicative of selectable mixes of the speaker channels and the object channel(s). The audio program associated with a soccer game. An encoded audio bitstream (e.g., an E-AC-3 bitstream) is indicative of the program's audio content and metadata. The audio content of the program (and thus of the bitstream) includes four independent substreams, as indicated in FIG. 11. One independent substream (labeled as substream "I0" in FIG. 11) is indicative of a 5.1 speaker channel bed indicative of neutral crowd noise at the soccer game. Another independent substream (labeled as substream "I1" in FIG. 11) is indicative of a 2.0 channel "Team A" bed ("M crowd") indicative of sound from the portion of the game crowd biased toward one team ("Team A"), a 2.0 channel "Team B" bed ("LivP crowd") indicative of sound from the portion of the game crowd biased toward the other team ("Team B"), and a monophonic object channel ("Sky comm 1") indicative of commentary on the game. A third independent substream (labeled as substream "I2" in FIG. 11) is indicative of object channel audio content (labeled "2/0 ball kick") indicative of sound produced by a game ball as it is struck by soccer game event participants, and three object channels ("Sky comm 2," "Man comm," and "Liv Comm") each indicative of a different commentary on the soccer game. The fourth independent substream (labeled as substream "I3" in FIG. 11) is indicative of an object channel (labeled "PA") indicative of sound produced by the stadium public address system at the soccer game, an object channel (labeled "Radio") indicative of a radio broadcast of the soccer game, and an object channel (labeled "Goal Flash") indicative of scoring of a goal during the soccer game.

In the FIG. 11 example, substream I0 includes the mix graph for the program and metadata ("obj md") including at least some of the substream metadata and at least some object channel related metadata. Each of substreams I1, I2, and I3 includes metadata ("obj md") at least some object channel related metadata and optionally at least some substream metadata.

In the FIG. 11 example, substream metadata of the bitstream indicates that during decoding, coupling should be "off" between each pair of the independent substreams (so that each independent substream is decoded independently of the other independent substreams), and substream metadata of the bitstream indicates the program channels within each substream for which coupling should be "on" (so that these channels are not decoded independently of each other) or "off" (so that these channels are decoded independently of each other). For example, the substream metadata indicates that coupling should be "on" internal to each of the two stereo speaker channel beds (the 2.0 channel "Team A" bed and the 2.0 channel "Team B" bed) of substream I1 but disabled across the speaker channel beds of substream I1 and between the monophonic object channel and each of the speaker channel beds of substream I1 (to cause the monophonic object channel and the speaker channel beds to be decoded independently of each other). Similarly, the substream metadata indicates that coupling should be "on" internal to the 5.1 speaker channel bed of substream I0 (to cause the speaker channels of this bed to be decoded in association with each other).

In some embodiments, speaker channels and object channels are included ("packed") within substreams of an audio program in a manner appropriate to a mix graph of the program. For example, if the mix graph is a tree graph, all channels of one branch of the graph may be included within one substream, and all channels of another branch of the graph may be included within another substream.

Figure 10:
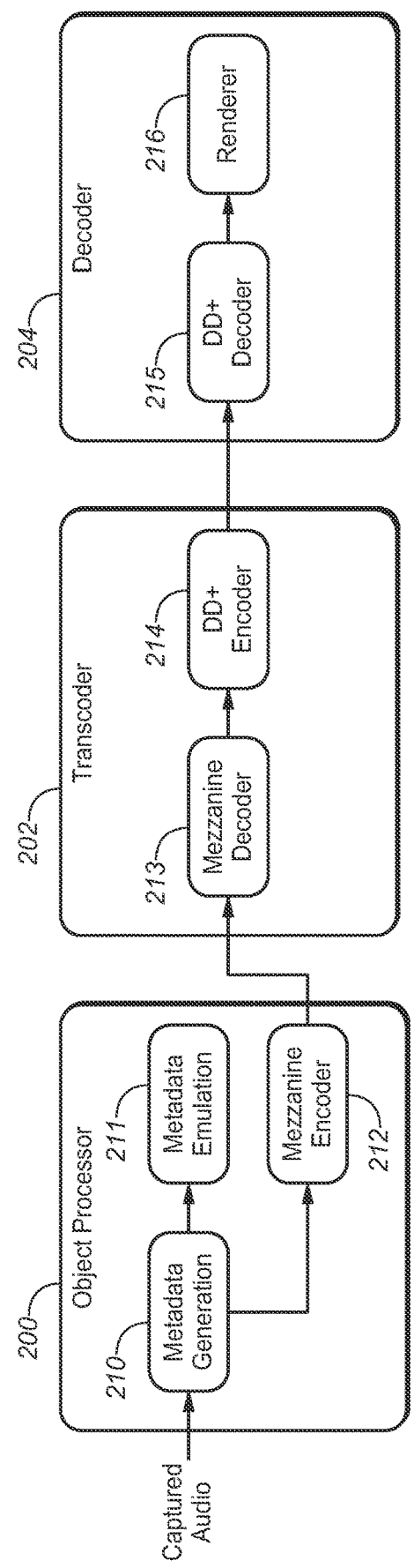
FIG. 10 is a block diagram of a system which may be implemented to perform an embodiment of the inventive method.

FIG. 10 is a block diagram of a system which implements an embodiment of the invention.

Object processing system (object processor) 200 of the FIG. 10 system includes metadata generation subsystem 210, mezzanine encoder 212, and emulation subsystem 211, coupled as shown. Metadata generation subsystem 210 is coupled to receive captured audio streams (e.g., streams indicative of sound captured by microphones positioned at a spectator event, and optionally also other audio streams), and configured to organize (e.g., group) the audio streams from console 104 into a bed of speaker channels, a set of replacement speaker channels, and a number of object channels and/or sets of object channels. Subsystem 210 is also configured to generate object related metadata (including conditional rendering metadata) indicative of the object channels (and/or object channel sets). Encoder 212 is configured to encode the object channels (and/or object channel sets), objected related metadata, and the speaker channels as a mezzanine type object based audio program (e.g., an object based audio program encoded as a Dolby E bitstream).

Emulation subsystem 211 of object processor 200 is configured to render (and play on a set of studio monitor speakers) at least a selected subset of the object channels (and/or object channel sets) and the speaker channels (including by using the object related metadata to generate a mix indicative of the selected object channel(s) and speaker channels) so that the played back sound can be monitored by the operator(s) of subsystem 200.

Transcoder 202 of the FIG. 10 system includes mezzanine decoder subsystem (mezzanine decoder) 213, and encoder 214, coupled as shown. Mezzanine decoder 213 is coupled and configured to receive and decode the mezzanine type object based audio program output from object processor 200. The decoded output of decoder 213 is re-encoded by encoder 214 into a format suitable for broadcast. In one embodiment, the encoded object based audio program output from encoder 214 is an E-AC-3 bitstream (and thus encoder 214 is labeled as "DD+ Encoder" in FIG. 10). In other embodiments, the encoded object based audio program output from encoder 214 is an AC-3 bitstream or has some other format. The object based audio program output of transcoder 202 is broadcast (or otherwise delivered) to a number of end users.

Decoder 204 is included in the playback system of one such end user. Decoder 204 includes decoder 215 and rendering subsystem (renderer) 216, coupled as shown. Decoder 215 accepts (receives or reads) and decodes the object based audio program delivered from transcoder 202. If decoder 215 is configured in accordance with a typical embodiment of the invention, the output of decoder 215 in typical operation includes: streams of audio samples indicative of the program's bed of speaker channels, and streams of audio samples indicative of object channels (e.g., user-selectable audio object channels) of the program and corresponding streams of object related metadata. In one embodiment, the encoded object based audio program input to decoder 215 is an E-AC-3 bitstream, and thus decoder 215 is labeled as "DD+ Decoder" in FIG. 10.

Renderer 216 of decoder 204 includes an object processing subsystem coupled to receive (from decoder 215) decoded speaker channels, object channels, and object related metadata of the delivered program. Renderer 216 also includes a rendering subsystem configured to render the audio content determined by the object processing subsystem, for playback by speakers (not shown) of the playback system.

Typically, renderer 216's object processing subsystem is configured to output to renderer 216's rendering subsystem a selected subset of the full set of object channels indicated by the program, and corresponding object related metadata. Renderer 216's object processing subsystem is typically also configured to pass through unchanged (to the rendering subsystem) the decoded speaker channels from decoder 215. The object channel selection performed by the object processing subsystem is determined in accordance with an embodiment of the invention, e.g., by user selection(s) and/or rules (e.g., indicative of conditions and/or constraints) which renderer 216 has been programmed or otherwise configured to implement.

Each of elements 200, 202, and 204 of FIG. 10 (and each of elements 104, 106, 108, and 110 of FIG. 8) may be implemented as a hardware system. The inputs of such a hardware implementation of processor 200 (or processor 106) would typically be multichannel audio digital interface ("MADI") inputs. Typically, processor 106 of FIG. 8, and each of encoders 212 and 214 of FIG. 10, includes a frame buffer. Typically, the frame buffer is a buffer memory coupled to receive an encoded input audio bitstream, and in operation the buffer memory stores (e.g., in a non-transitory manner) at least one frame of the encoded audio bitstream, and a sequence of the frames of the encoded audio bitstream is asserted from the buffer memory to a downstream device or system. Also typically, each of decoders 213 and 215 of FIG. 10 includes a frame buffer. Typically, this frame buffer is a buffer memory coupled to receive an encoded input audio bitstream, and in operation the buffer memory stores (e.g., in a non-transitory manner) at least one frame of the encoded audio bitstream to be decoded by decoder 213 or 215.

Any of the components or elements of processor 106 of FIG. 8 (or subsystems 200, 202, and/or 204 of FIG. 10) may be implemented as one or more processes and/or one or more circuits (e.g., ASICs, FPGAs, or other integrated circuits), in hardware, software, or a combination of hardware and software.

It should be appreciated that in some embodiments, the inventive object based audio program is generated and/or delivered as an un-encoded (e.g., baseband) representation which is indicative of the program content (including metadata). For example, such representation can comprise PCM audio samples and associated metadata. The un-encoded (uncompressed) representation can be delivered in any of a variety of ways, including as at least one file of data (e.g., stored in a non-transient manner in a memory, e.g., on computer-readable media), or as a bitstream in AES-3 format or in Serial Digital Interface (SDI) format (or in another format).

An aspect of the invention is an audio processing unit (APU) configured to perform any embodiment of the inventive method. Examples of APUs include, but are not limited to encoders (e.g., transcoders), decoders, codecs, pre-processing systems (pre-processors), post-processing systems (post-processors), audio bitstream processing systems, and combinations of such elements.

In a class of embodiments, the invention is an APU including a buffer memory (buffer) which stores (e.g., in a non-transitory manner) at least one frame or other segment (including audio content of speaker channels and of at least one object channel, and object related metadata including conditional rendering metadata) of an object based audio program which has been generated by any embodiment of the inventive method. For example, production unit 3 of FIG. 5 may include buffer 3A, which stores (e.g., in a non-transitory manner) at least one frame or other segment (including audio content of speaker channels and of at least one object channel, and object related metadata including conditional rendering metadata) of the object based audio program generated by unit 3. For another example, decoder 7 of FIG. 5 may include buffer 7A, which stores (e.g., in a non-transitory manner) at least one frame or other segment (including audio content of speaker channels and of at least one object channel, and object related metadata including conditional rendering metadata) of the object based audio program delivered from subsystem 5 to decoder 7.

Embodiments of the present invention may be implemented in hardware, firmware, or software, or a combination thereof (e.g., as a programmable logic array). For example, subsystem 106 of FIG. 8, or the FIG. 7 system, or all or some of elements 20, 22, 24, 25, 26, 29, 35, 31, and 35 of the FIG. 6 system, or all or some of elements 200, 202, and 204 of FIG. 10, may be implemented in appropriately programmed (or otherwise configured) hardware or firmware, e.g., as a programmed general purpose processor, digital signal processor, or microprocessor. Unless otherwise specified, the algorithms or processes included as part of the invention are not inherently related to any particular computer or other apparatus. In particular, various general-purpose machines may be used with programs written in accordance with the teachings herein, or it may be more convenient to construct more specialized apparatus (e.g., integrated circuits) to perform the required method steps. Thus, the invention may be implemented in one or more computer programs executing on one or more programmable computer systems (e.g., an implementation of all or some of elements 20, 22, 24, 25, 26, 29, 35, 31, and 35 of FIG. 6), each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

For example, when implemented by computer software instruction sequences, various functions and steps of embodiments of the invention may be implemented by multithreaded software instruction sequences running in suitable digital signal processing hardware, in which case the various devices, steps, and functions of the embodiments may correspond to portions of the software instructions.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be implemented as a computer-readable storage medium, configured with (i.e., storing) a computer program, where the storage medium so configured causes a computer system to operate in a specific and predefined manner to perform the functions described herein.

A number of embodiments of the invention have been described. It should be understood that various modifications may be made without departing from the spirit and scope of the invention. Numerous modifications and variations of the present invention are possible in light of the above teachings. It is to be understood that within the scope of the appended claims, the invention may be practiced otherwise than as specifically described herein.

What is claimed is:

1. A method for generating audio content for an object based audio program, said method comprising:
generating conditional rendering metadata corresponding to at least one object channel of the audio program, wherein the conditional rendering metadata is indicative of at least one rendering constraint for the at least one object channel, wherein the rendering constraint is related to a playback speaker array configuration;
receiving spatial position metadata for the object channel;
determining a set of audio channels including the at least one object channel based on the conditional rendering metadata; and
generating the object based audio program such that said object based audio program is indicative of the set of audio channels, the conditional rendering metadata and the spatial position metadata,
wherein the rendering constraint includes a constraint relating to an elevation of at least a speaker in the playback speaker array configuration, wherein the at least a speaker in the playback speaker array configuration has an assumed location based on the rendering constraint of the conditional rendering metadata, and wherein the object based audio program is an encoded bitstream comprising frames.

2. A method of rendering audio content for an object based audio program, said method comprising:
receiving conditional rendering metadata corresponding to at least one object channel of the audio program, wherein the conditional rendering metadata is indicative of at least one rendering constraint for the at least one object channel, wherein the rendering constraint is related to a playback speaker array configuration, and wherein the object based audio program is an encoded bitstream comprising frames;
receiving spatial position metadata for the object channel;
rendering the audio content based on the spatial position metadata and the rendering constraint of the conditional rendering metadata, wherein the rendering constraint includes a constraint relating to an elevation of at least a speaker in the playback speaker array configuration.

3. A system for rendering audio content for an object based audio program, said system comprising:
a first receiver for receiving conditional rendering metadata corresponding to at least one object channel of the audio program, wherein the conditional rendering metadata is indicative of at least one rendering constraint for the at least one object channel, wherein the rendering constraint is related to a playback speaker array configuration, and wherein the object based audio program is an encoded bitstream comprising frames;
a second receiver receiving spatial position metadata for the object channel;
a rendering subsystem for rendering the audio content based on the spatial position metadata and the rendering constraint of the conditional rendering metadata, wherein the rendering constraint includes a constraint relating to an elevation of at least a speaker in the playback speaker array configuration.

4. A non-transitory medium having software stored thereon, the software including instructions for performing the method of claim 1.

5. A non-transitory medium having software stored thereon, the software including instructions for performing the method of claim 2.

* * * * *